(12) United States Patent
Barrus et al.

(10) Patent No.: US 9,558,170 B2
(45) Date of Patent: *Jan. 31, 2017

(54) CREATING AND SWITCHING A VIEW OF A COLLECTION INCLUDING IMAGE DATA AND SYMBOLIC DATA

(71) Applicant: Ricoh Company, Ltd., Tokyo (JP)

(72) Inventors: John W. Barrus, Menlo Park, CA (US); Edward L. Schwartz, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 435 days.

This patent is subject to a terminal disclaimer.

(21) Appl. No.: 13/781,721

(22) Filed: Feb. 28, 2013

(65) Prior Publication Data

US 2014/0245121 A1 Aug. 28, 2014

(51) Int. Cl.
*G06F 17/00* (2006.01)
*G06F 17/30* (2006.01)
*G06F 17/24* (2006.01)

(52) U.S. Cl.
CPC .......... *G06F 17/245* (2013.01); *G06F 17/243* (2013.01); *G06F 17/247* (2013.01)

(58) Field of Classification Search
CPC ............ G06F 17/3033; G06F 17/30994; G06F 17/30979; G06F 17/30011; G06F 17/30424
See application file for complete search history.

(56) References Cited

U.S. PATENT DOCUMENTS

| | | | | |
|---|---|---|---|---|
| 2004/0122794 A1* | 6/2004 | Gwizdaloski | ......... | G06F 17/245 |
| 2005/0262425 A1* | 11/2005 | Vignet | .................. | G06Q 10/06 715/209 |
| 2006/0044619 A1* | 3/2006 | Namiki | ................ | G06F 17/242 358/3.28 |
| 2010/0125579 A1* | 5/2010 | Pardoe et al. | ................ | 707/736 |
| 2012/0189203 A1* | 7/2012 | Lin et al. | ...................... | 382/181 |
| 2012/0192050 A1* | 7/2012 | Campbell | .............. | G06Q 10/06 715/212 |

OTHER PUBLICATIONS

Annie Cushing, "How to go Picasso on your data with conditional formatting," Search Engine Land, Sep. 14, 2012, pp. 1-10.*

* cited by examiner

*Primary Examiner* — Ariel Mercado
(74) *Attorney, Agent, or Firm* — Patent Law Works LLP

(57) ABSTRACT

An Image Based Document Management (IBDM) server includes a state recorder, a query engine, a view creation module and a user interface engine. The view creation module creates a first view of a collection based on at least one operation from a first user. The state recorder receives a selection of the first view of the collection from a user. The query engine runs a query associated with the first view of the collection. The user interface engine generates graphical data for presenting a list of views of the collection including the first view of the collection to a user and for displaying the first view of the collection to the user.

20 Claims, 17 Drawing Sheets

300

First Name: *Indigo*   Date: *Dec 14 2012*

From CA: ☐   Not From CA: ☑

Zip Code: *94123*   Phone: *650 555 6500*

Email Address: *indigo@email.com*

I have lived *25* years in my current home or apartment.

Number of Pets: *2*

Number of Children: *1*

| Write 1 to 5 in order of preference. | What do you like about California? |
|---|---|
| *5* Milk | *beautiful* |
| *2* Tea | |
| *1* Orange Juice | |
| *3* Coffee | |
| *4* Water | |

Filling out the survey was:

☐ — ☐ — ☑ — ☐ — ☐
Very hard   Hard   Neither   Easy   Very easy

Figure 3A

| | | | | | | | | | | |
|---|---|---|---|---|---|---|---|---|---|---|
| Document Management | | | | | | | | | | |
| Open Close Preferences Fit 100% Blank Form Exit | | | | | | | | | | |
| Blank Form | Spreadsheet | Forms | Single Form - Edit | | | | | | | |
| 72 rows | Label: Symbolic | Mode: Strokes | | Auto Refresh: Off | | | View: Original | | | |
| First Name | Date | From CA | Not From CA | Zip Code | Phone | Email | Years | Num Pets | Num Children | Milk | Tea |
| Indigo | Dec 14 2012 | | ✓ | 94123 | 650 555 6500 | indigo@email.com | 25 | 2 | 1 | 5 | 2 |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@eee.com | 10 | 9 | 4 | 1 | 5 |
| John | Dec 7 2012 | | ✓ | 56437 | 111 111 1111 | john@fake.com | 3 | 5 | 2 | 1 | 2 |
| Roy | 6 Dec 2012 | ✗ | | 12612 | 555 123 4567 | roy@email.com | 5 | 2 | 3 | 5 | 4 |
| Jazz | 6 Dec 2012 | ✓ | | 62072 | 333 777 9999 | jazz@example.com | 3 | 7 | 1 | 4 | 1 |
| Elisha | 6 Dec 2012 | ✓ | | 72153 | 987 654 3210 | E@example.com | 3 | 4 | 2 | 4 | 5 |
| Avy | 5 Dec 2012 | | | 38999 | 222 333 4444 | avy@fake.com | 4 | 1 | 2 | 3 | 2 |
| Dates: All | | | | | | | | | | Apply |

Document Management
Open  Close  Preferences  Fit 100%  Blank Form  Exit
Blank Form | Spreadsheet | Forms | Single Form | Edit 72 rows   Label: [Symbolic]   Mode: [Strokes]   Auto Refresh: [Off]   View [Original]  ▼ ⊞ ⊟

| First Name | Date | From CA | Not From CA | Zip Code | Phone | Email | Years | Num Pets | Num Children | Milk | Tea |
|---|---|---|---|---|---|---|---|---|---|---|---|
| *Indigo* | *Dec 14 2012* |  | ✓ | *94123* | *650 650 6500* | *indigo@email.com* | *25* | 2 | *1* | *5* | *2* |
| Oscar | 11 Dec 2012 | ✗ |  | *12118* | *111 222 8888* | *oscar@fake.com* | *1* | 2 | 3 | 3 | 1 |
| *Molly* | *12/7/2012* | ✗ |  | *12347* | *123 456 7890* | *molly4eee.com* | *10* | 9 | 4 | *1* | *5* |
| John | Dec 7 2012 |  | ✓ | 56437 | 111 111 1111 | john@fake.com | 3 | 5 | 2 | 1 | 2 |
| *Roy* | *6 Dec 2012* | ✗ |  | *12612* | *555 123 4567* | *roy@email.com* | *5* | 2 | 3 | 5 | 4 |
| *Jazz* | *6 Dec 2012* |  | ✓ | *62012* | *333 777 9999* | *jazz@example.com* | *3* | 7 | 1 | 4 | 1 |
| *Elisha* | *6 Dec 2012* |  | ✓ | *72133* | *987 654 3210* | *Eli@example.com* | *3* | 4 | 2 | 4 | 5 |
| Avy | 5 Dec 2012 |  |  | *38999* | 222 333 4444 | avy@fake.com | 4 | 1 | 2 | 3 | 2 |

Dates [All ▼] [Apply]

701 — 332 — 708 — 704

Document Management
Open  Close  Preferences  Fit 100%  Blank Form  Exit
Blank Form | Spreadsheet | Forms | Single Form - Edit 72 rows   Label: [Symbolic]   Mode: [Symbolic]   Auto Refresh: [Off]   View [New View]  ▼ ⊞ ⊟

| First Name | Date | From CA | Not From CA | Zip Code | Phone | Email | Years | Num Pets | Num Children | Milk | Tea |
|---|---|---|---|---|---|---|---|---|---|---|---|
| *Indigo* | Dec 14 2012 |  | True | *94123* | 650 650 6500 | indigo@email.com | 25 | 2 | *1* | *5* | *2* |
| Oscar | 11 Dec 2012 | True |  | *12118* | 111 222 8888 | oscar@fake.com | 1 | 2 | 3 | 3 | 1 |
| Molly | 12/7/2012 | True |  | *12347* | 123 456 7890 | molly4eee.com | 10 | 9 | 4 | *1* | *5* |
| John | Dec 7 2012 |  | True | 56437 | 111 111 1111 | john@fake.com | 3 | 5 | 2 | 1 | 2 |
| Roy | 6 Dec 2012 | True |  | *12612* | 555 123 4567 | roy@email.com | 5 | 2 | 3 | 5 | 4 |
| Jazz | 6 Dec 2012 |  | True | *62012* | 333 777 9999 | jazz@example.com | 3 | 7 | 1 | 4 | 1 |
| *Elisha* | 6 Dec 2012 |  | True | *72133* | 987 654 3210 | Eli@example.com | 3 | 4 | 2 | 4 | 5 |
| Avy | 5 Dec 2012 |  |  | *38999* | 222 333 4444 | avy@fake.com | 4 | 1 | 2 | 3 | 2 |

Dates [All ▼] [Apply]

Figure 7A

| First Name | Date | From CA | Not From CA | Zip Code | Phone | Email | Years | Num Pets | Num Children | Milk | Tea |
|---|---|---|---|---|---|---|---|---|---|---|---|
| Indigo | Dec 14 2012 | | ✓ | 94123 | 650 650 6500 | indigo@email.com | 25 | 2 | 1 | 5 | 2 |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@eee.com | 10 | 9 | 4 | 1 | 5 |
| John | Dec 7 2012 | | ✓ | 56437 | 111 111 1111 | john@fake.com | 3 | 5 | 2 | 1 | 2 |
| Rey | 6 Dec 2012 | ✗ | | 12612 | 555 123 4567 | rey@email.com | 5 | 2 | 3 | 5 | 4 |
| Jazz | 6 Dec 2012 | ✓ | | 62012 | 333 777 9999 | jazz@example.com | 3 | 7 | 1 | 4 | 1 |
| Elisha | 6 Dec 2012 | ✓ | | 72133 | 987 654 3210 | Eli@example.com | 3 | 4 | 2 | 4 | 5 |
| Avy | 5 Dec 2012 | | | 38999 | 222 333 4444 | avy@fake.com | 4 | 1 | 2 | 3 | 2 |

Dates [All ▼] [Apply]

| Date | First Name | From CA | Not From CA | Zip Code | Phone | Email | Years | Num Pets | Num Children |
|---|---|---|---|---|---|---|---|---|---|
| Dec 14 2012 | Indigo | | ✓ | 94123 | 650 650 6500 | indigo@email.com | 25 | 2 | 1 |
| 11 Dec 2012 | Oscar | ✗ | | 12118 | 111 222 8888 | oscar@fake.com | 1 | 2 | 3 |
| 12/7/2012 | Molly | ✗ | | 12347 | 123 456 7890 | molly@eee.com | 10 | 9 | 4 |
| Dec 7 2012 | John | | ✓ | 56437 | 111 111 1111 | john@fake.com | 3 | 5 | 2 |
| 6 Dec 2012 | Rey | ✗ | | 12612 | 555 123 4567 | rey@email.com | 5 | 2 | 3 |
| 6 Dec 2012 | Jazz | ✓ | | 62012 | 333 777 9999 | jazz@example.com | 3 | 7 | 1 |
| 6 Dec 2012 | Elisha | ✓ | | 72133 | 987 654 3210 | Eli@example.com | 3 | 4 | 2 |
| 5 Dec 2012 | Avy | | | 38999 | 222 333 4444 | avy@fake.com | 4 | 1 | 2 |

Dates [All ▼] [Apply]

| Document Management | | | | | | | | | | | |
|---|---|---|---|---|---|---|---|---|---|---|---|
| Blank Form | Spreadsheet | Forms | Single Form - Edit | | | | | | | | |
| (72 rows) Label: [Symbolic] Mode: [Strokes] Auto Refresh: [Off] View [Original] ▼ ⊞ ⊟ | | | | | | | | | | | |
| First Name | Date | From CA | Not From CA | Zip Code | Phone | Email | Years | Num Pets | Num Children | Milk | Tea |
| Indigo | Dec 14 2012 | | ✓ | 94123 | 650 650 6500 | indigo@email.com | 25 | 2 | 1 | 5 | 2 |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@ee.com | 10 | 9 | 4 | 1 | 5 |
| John | Dec 7 2012 | | ✓ | 56437 | 111 111 1111 | john@fake.com | 3 | 5 | 2 | 1 | 2 |
| Roy | 6 Dec 2012 | ✗ | | 12612 | 555 123 4567 | roy@email.com | 5 | 2 | 3 | 5 | 4 |
| Jazz | 6 Dec 2012 | ✓ | | 62012 | 333 777 9999 | jazz@example.com | 3 | 7 | 1 | 4 | 1 |
| Elisha | 6 Dec 2012 | ✓ | | 72133 | 987 654 3210 | E@example.com | 3 | 4 | 2 | 4 | 5 |
| Avy | 5 Dec 2012 | | | 38999 | 222 333 4444 | avy@fake.com | 4 | 1 | 2 | 3 | 2 |

Dates [All] ▼ [Apply]

734　　　　　　　731　　　　　　　　　　　　　　704

| Document Management | | | | | | | | | | | |
|---|---|---|---|---|---|---|---|---|---|---|---|
| Blank Form | Spreadsheet | Forms | Single Form - Edit | | | | | | | | |
| (45 rows) Label: [Symbolic] Mode: [Strokes] Auto Refresh: [Off] View [New View] ▼ ⊞ ⊟ | | | | | | | | | | | |
| First Name | Date | From CA | Not From CA | Zip Code | Phone | Email | Years | Num Pets | Num Children | Milk | Tea |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@ee.com | 10 | 9 | 4 | 1 | 5 |
| Roy | 6 Dec 2012 | ✗ | | 12612 | 555 123 4567 | roy@email.com | 5 | 2 | 3 | 5 | 4 |
| Jazz | 6 Dec 2012 | ✓ | | 62012 | 333 777 9999 | jazz@example.com | 3 | 7 | 1 | 4 | 1 |
| Elisha | 6 Dec 2012 | ✓ | | 72133 | 987 654 3210 | E@example.com | 3 | 4 | 2 | 4 | 5 |
| Denny | 12/6/2012 | ✓ | | 38999 | 333 2222 111 | denny@fake.com | 6 | 0 | 4 | 2 | 1 |
| Rob | 6 Dec 12 | ✗ | | 11111 | 666 5555555 | Rob@mail.com | 3 | 5 | 1 | 5 | 3 |

Dates [All] ▼ [Apply]

Document Management

Blank Form | Spreadsheet | Forms | Single Form - Edit 72 rows  Label: [Symbolic]  Mode: [Strokes]  Auto Refresh: [Off]  View [Original ▼] [+][-]

| First Name | Date | From CA | Not From CA | Zip Code | Phone | Email | Years | Num Pets | Num Children | Milk | Tea |
|---|---|---|---|---|---|---|---|---|---|---|---|
| Indigo | Dec 14 2012 |  | ✓ | 94123 | 650 650 6500 | indigo@email.com | 25 | 2 | 1 | 5 | 2 |
| Oscar | 11 Dec 2012 | ✗ |  | 12118 | 111 222 8888 | oscar@fake.com | 1 | 2 | 3 | 3 | 1 |
| Molly | 12/7/2012 | ✗ |  | 12347 | 123 456 7890 | molly@eee.com | 10 | 9 | 4 | 1 | 5 |
| John | Dec 7 2012 |  | ✓ | 56437 | 111 111 1111 | john@fake.com | 3 | 5 | 2 | 1 | 2 |
| Roy | 6 Dec 2012 | ✗ |  | 12612 | 555 123 4567 | roy@email.com | 5 | 2 | 3 | 5 | 4 |
| Jazz | 6 Dec 2012 |  | ✓ | 62012 | 333 777 9999 | jazz@example.com | 3 | 7 | 1 | 4 | 1 |
| Elisha | 6 Dec 2012 |  | ✓ | 72133 | 987 654 3210 | Eli@example.com | 3 | 4 | 2 | 4 | 5 |
| Avy | 5 Dec 2012 |  |  | 38999 | 222 333 4444 | avy@fake.com | 4 | 1 | 2 | 3 | 2 |

Dates [All ▼] [Apply]

741    704    744

Document Management

Blank Form | Spreadsheet | Forms | Single Form - Edit 72 rows  Label: [Symbolic]  Mode: [Strokes]  Auto Refresh: [Off]  View [New View ▼] [+][-]

| First Name | Date | From CA | Not From CA | Zip Code | Phone | Email | Years | N P |
|---|---|---|---|---|---|---|---|---|
| Indigo | Dec 14 2012 |  | ✓ | 94123 | 650 650 6500 | indigo@email.com | 25 |  |
| Oscar | 11 Dec 2012 | ✗ |  | 12118 | 111 222 8888 | oscar@fake.com | 1 |  |
| Molly | 12/7/2012 | ✗ |  | 12347 | 123 456 7890 | molly@eee.com | 10 |  |
| John | Dec 7 2012 |  | ✓ | 56437 | 111 111 1111 | john@fake.com | 3 |  |
| Roy | 6 Dec 2012 | ✗ |  | 12612 | 555 123 4567 | roy@email.com | 5 |  |
| Jazz | 6 Dec 2012 |  | ✓ | 62012 | 333 777 9999 | jazz@example.com | 3 |  |

Dates [All ▼] [Apply]

| Document Management | | | | | | | | | | | | |
|---|---|---|---|---|---|---|---|---|---|---|---|---|
| Blank Form | Spreadsheet | Forms | Single Form - Edit | | | | | | | | | |
| 72 rows | Label: Symbolic | | Mode: Strokes | Auto Refresh: Off | | | View | Original | | | ⊞ ⊟ | |
| First Name | Date | From CA | Not From CA | Zip Code | Phone | Email | Years | Num Pets | Num Children | Milk | Tea | |
| Indigo | Dec 14 2012 | | ✓ | 94123 | 650 650 6500 | indigo@email.com | 25 | 2 | 1 | 5 | 2 | |
| Oscar | 11 Dec 2012 | ✗ | | 12118 | 111 222 8888 | oscar@fake.com | 1 | 2 | 3 | 3 | 1 | |
| Molly | 12/7/2012 | ✗ | | 12347 | 123 456 7890 | molly@eee.com | 10 | 9 | 4 | 1 | 5 | |
| John | Dec 7 2012 | | ✓ | 56437 | 111 111 1111 | john@fake.com | 3 | 5 | 2 | 1 | 2 | |
| Roy | 6 Dec 2012 | ✗ | | 12612 | 555 123 4567 | roy@email.com | 5 | 2 | 3 | 5 | 4 | |
| Jazz | 6 Dec 2012 | ✓ | | 62012 | 333 777 9999 | jazz@example.com | 3 | 7 | 1 | 4 | 1 | |
| Elisha | 6 Dec 2012 | ✓ | | 72133 | 987 654 3210 | Eli@example.com | 3 | 4 | 2 | 4 | 5 | |
| Avy | 5 Dec 2012 | | | 38999 | 222 333 4444 | avy@fake.com | 4 | 1 | 2 | 3 | 2 | |

Dates [All ▼] [Apply]

332  751

| Document Management | | | | | | | | | | | | |
|---|---|---|---|---|---|---|---|---|---|---|---|---|
| Blank Form | Spreadsheet | Forms | Single Form - Edit | | | | | | | | | |
| 72 rows | Label: Strokes | | Mode: Strokes | Auto Refresh: Off | | | View | New View | | | ⊞ ⊟ | |
| First Name | Date | From CA | Not From CA | Zip Code | Phone | Email Address | years | Number of Pets | Number of Children | Milk | Tea | |
| Indigo | Dec 14 2012 | | ✓ | 94123 | 650 650 6500 | indigo@email.com | 25 | 2 | 1 | 5 | 2 | |
| Oscar | 11 Dec 2012 | ✗ | | 12118 | 111 222 8888 | oscar@fake.com | 1 | 2 | 3 | 3 | 1 | |
| Molly | 12/7/2012 | ✗ | | 12347 | 123 456 7890 | molly@eee.com | 10 | 9 | 4 | 1 | 5 | |
| John | Dec 7 2012 | | ✓ | 56437 | 111 111 1111 | john@fake.com | 3 | 5 | 2 | 1 | 2 | |
| Roy | 6 Dec 2012 | ✗ | | 12612 | 555 123 4567 | roy@email.com | 5 | 2 | 3 | 5 | 4 | |
| Jazz | 6 Dec 2012 | ✓ | | 62012 | 333 777 9999 | jazz@example.com | 3 | 7 | 1 | 4 | 1 | |
| Elisha | 6 Dec 2012 | ✓ | | 72133 | 987 654 3210 | Eli@example.com | 3 | 4 | 2 | 4 | 5 | |
| Avy | 5 Dec 2012 | | | 38999 | 222 333 4444 | avy@fake.com | 4 | 1 | 2 | 3 | 2 | |

Dates [All ▼] [Apply]

Document Management — 332, 702

| Blank Form | Spreadsheet | Forms | Single Form - Edit |

72 rows  Label: Symbolic  Mode: Strokes  Auto Refresh: Off  View: Original

| First Name | Date | From CA | Not From CA | Zip Code | Phone | Email | Years | Num Pets | Num Children | Milk | Tea |
|---|---|---|---|---|---|---|---|---|---|---|---|
| Indigo | Dec 14 2012 | | ✓ | 94123 | 650 650 6500 | indigo@email.com | 25 | 2 | 1 | 5 | 2 |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@eee.com | 10 | 9 | 4 | 1 | 5 |
| John | Dec 7 2012 | | ✓ | 56437 | 111 111 1111 | john@fake.com | 3 | 5 | 2 | 1 | 2 |
| Roy | 6 Dec 2012 | ✗ | | 12612 | 555 123 4567 | roy@email.com | 5 | 2 | 3 | 5 | 4 |
| Jazz | 6 Dec 2012 | | ✓ | 62012 | 333 777 9999 | jazz@example.com | 3 | 7 | 1 | 4 | 1 |
| Elisha | 6 Dec 2012 | | ✓ | 72133 | 987 654 3210 | Eli@example.com | 3 | 4 | 2 | 4 | 5 |
| Avy | 5 Dec 2012 | | | 38999 | 222 333 4444 | avy@fake.com | 4 | 1 | 2 | 3 | 2 |

Dates [All ▼] [Apply]

761 — 764, 762, 704

Document Management

| Blank Form | Spreadsheet | Forms | Single Form - Edit |

72 rows  Label: Symbolic  Mode: Strokes  Auto Refresh: Off  View: New View

| First Name | Date | From CA | Not From CA | Zip Code | Phone | Email | Years | Num Pets | Num Children | Milk | Tea |
|---|---|---|---|---|---|---|---|---|---|---|---|
| Oscar | 11 Dec 2012 | ✗ | | 12118 | 111 222 8888 | oscar@fake.com | 1 | 2 | 3 | 3 | 1 |
| Elisha | 6 Dec 2012 | | ✓ | 72133 | 987 654 3210 | Eli@example.com | 3 | 4 | 2 | 4 | 5 |
| Jazz | 6 Dec 2012 | | ✓ | 62012 | 333 777 9999 | jazz@example.com | 3 | 7 | 1 | 4 | 1 |
| John | Dec 7 2012 | | ✓ | 56437 | 111 111 1111 | john@fake.com | 3 | 5 | 2 | 1 | 2 |
| Avy | 5 Dec 2012 | | | 38999 | 222 333 4444 | avy@fake.com | 4 | 1 | 2 | 3 | 2 |
| Roy | 6 Dec 2012 | ✗ | | 12612 | 555 123 4567 | roy@email.com | 5 | 2 | 3 | 5 | 4 |
| Molly | 12/7/2012 | ✗ | | 12347 | 123 456 7890 | molly@eee.com | 10 | 9 | 4 | 1 | 5 |
| Indigo | Dec 14 2012 | | ✓ | 94123 | 650 650 6500 | indigo@email.com | 25 | 2 | 1 | 5 | 2 |

Dates [All ▼] [Apply]

Figure 7G

Figure 7H — 770 (702, Original view, 772):

| First Name | Date | From CA | Not From CA | Zip Code | Phone | Email | Years | Num Pets | Num Children | Milk | Tea |
|---|---|---|---|---|---|---|---|---|---|---|---|
| Indigo | Dec 14 2012 | | ✓ | 94123 | 650 650 6500 | indigo@email.com | 25 | 2 | 1 | 5 | 2 |
| Oscar | 11 Dec 2012 | ✗ | | 12118 | 111 222 8888 | oscar@fake.com | 1 | 2 | 3 | 3 | 1 |
| Molly | 12/7/2012 | ✗ | | 12347 | 123 456 7890 | molly@eee.com | 10 | 9 | 4 | 1 | 5 |
| John | Dec 7 2012 | | ✓ | 56437 | 111 111 1111 | john@fake.com | 3 | 5 | 2 | 1 | 2 |
| Ray | 6 Dec 2012 | ✗ | | 12612 | 555 123 4567 | ray@email.com | 5 | 2 | 3 | 5 | 4 |
| Jazz | 6 Dec 2012 | ✓ | | 62012 | 333 777 9999 | jazz@example.com | 3 | 7 | 1 | 4 | 1 |
| Elisha | 6 Dec 2012 | ✓ | | 72133 | 987 654 3210 | Eli@example.com | 3 | 4 | 2 | 4 | 5 |
| Avy | 5 Dec 2012 | | | 38999 | 222 333 4444 | avy@fake.com | 4 | 1 | 2 | 3 | 2 |

Dates: All — Apply 771 (704, New View, 774):

| First Name | Date | From CA | Not From CA | Zip Code | Phone | Email | Years | Num Pets | Num Children | Milk |
|---|---|---|---|---|---|---|---|---|---|---|
| Indigo | Dec 14 2012 | | ✓ | 94123 | 650 650 6500 | indigo@email.com | 25 | 2 | 1 | 5 |
| Oscar | 11 Dec 2012 | ✗ | | 12118 | 111 222 8888 | oscar@fake.com | 1 | 2 | 3 | 3 |
| Molly | 12/7/2012 | ✗ | | 12347 | 123 456 7890 | molly@eee.com | 10 | 9 | 4 | 1 |
| John | Dec 7 2012 | | ✓ | 56437 | 111 111 1111 | john@fake.com | 3 | 5 | 2 | 1 |
| Ray | 6 Dec 2012 | ✗ | | 12612 | 555 123 4567 | ray@email.com | 5 | 2 | 3 | 5 |
| Jazz | 6 Dec 2012 | ✓ | | 62012 | 333 777 9999 | jazz@example.com | 3 | 7 | 1 | 4 |
| Elisha | 6 Dec 2012 | ✓ | | 72133 | 987 654 3210 | Eli@example.com | 3 | 4 | 2 | 4 |
| Avy | 5 Dec 2012 | | | 38999 | 222 333 4444 | avy@fake.com | 4 | 1 | 2 | 3 |

Dates: All — Apply

Figure 7H

CREATING AND SWITCHING A VIEW OF A COLLECTION INCLUDING IMAGE DATA AND SYMBOLIC DATA

BACKGROUND OF THE INVENTION

1. Field of the Invention

The specification relates to processing of forms. In particular, the specification relates to creating a view for a collection of forms that includes both image data and symbolic data.

2. Description of the Background Art

Spreadsheet programs have many ways of filtering and sorting content. However, the content is limited to only text fields. As the use of portable computing devices becomes common, many users input information into a form by using a stylus or a fingertip on the portable computing devices. For a table that includes handwriting or other types of strokes captured from the portable computing devices (e.g. a checkmark), a view can be used to display the table. The view may include sort and filter information based on the handwriting or other types of strokes. This approach, however, does not work if a column has both images and text.

SUMMARY OF THE INVENTION

The disclosure overcomes the deficiencies of the prior art with a system for creating a view for a collection of forms that includes both image data and symbolic data. In one embodiment, an Image Based Document Management (IBDM) server includes a view application that comprises a state recorder, a query engine, a view creation module and a user interface engine. The view creation module creates a first view of a collection based on at least one operation from a first user. The state recorder receives a selection of the first view of the collection from a second user, the second user having access to the collection. The query engine runs a query associated with the first view of the collection. The user interface engine generates graphical data for presenting a list of views of the collection including the first view of the collection to the second user and for displaying the first view of the collection to the second user.

Other aspects include corresponding methods, systems, apparatuses, and computer program products for these and other innovative aspects.

The system can be used to quickly organize data from one or more users without requiring the expensive process of transcribing all cells with image data to symbolic representations. The system advantageously creates and switches between views that include both image data and symbolic data. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3A is a graphic representation of an example survey form.

FIG. 3B is a graphic representation of an original view of a collection.

FIG. 3C is a graphic representation of a modified view of a collection.

FIGS. 7A-7H are graphic representations of example views of a collection.

DETAILED DESCRIPTION OF THE PREFERRED EMBODIMENTS

Figure 1:
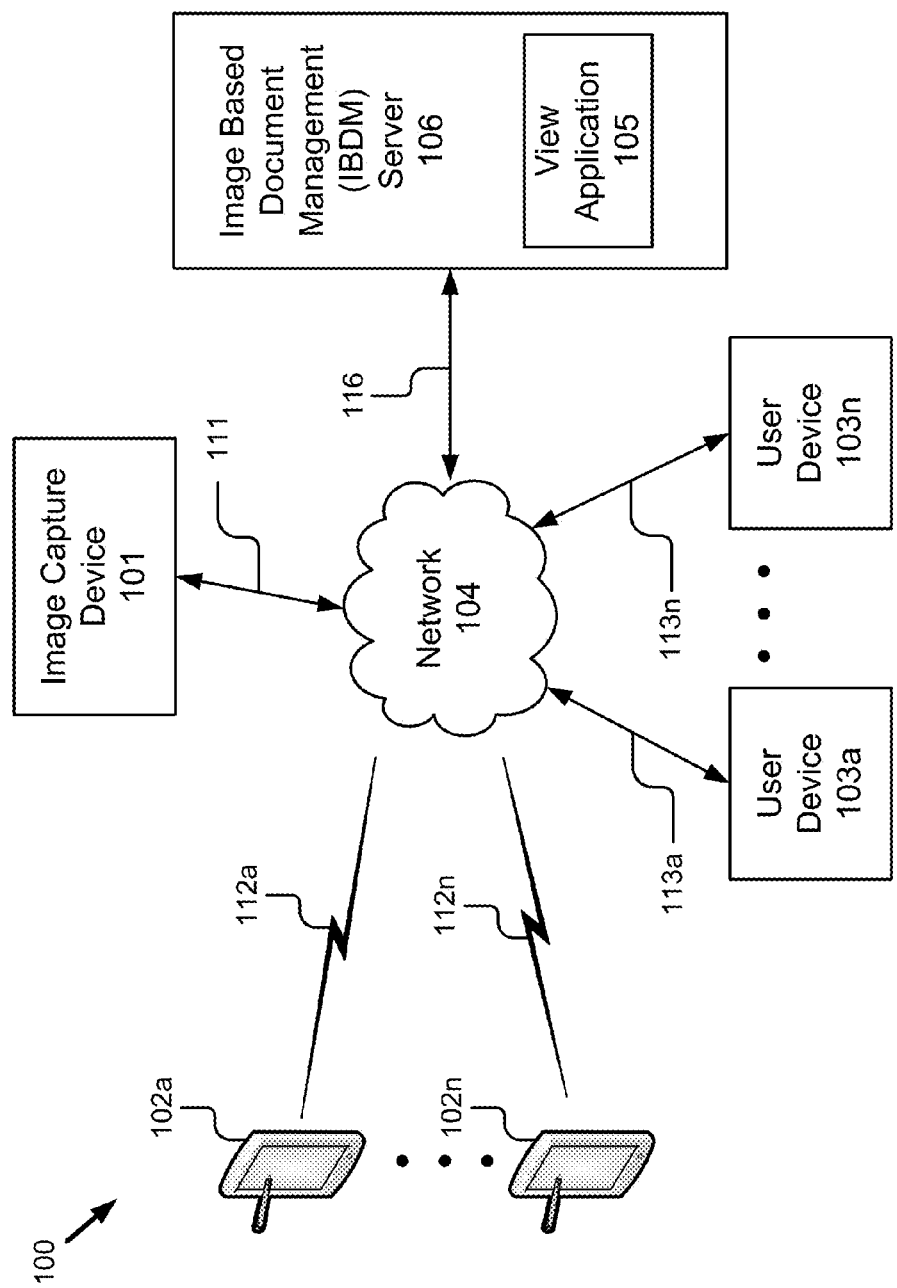
FIG. 1 is a high-level block diagram illustrating one embodiment of a system for creating a view of a collection of forms.

A description of a system and method for creating a view for a collection of forms that includes both image data and symbolic data follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for creating a view for a collection of forms that includes both image data and symbolic data and creating a second view based on a user operation. The system 100 includes an image capture device 101, portable computing devices 102a-102n, user devices 103a-103n and an Image Based Document Management (IBDM) server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103a-103n, the plurality of portable computing devices 102a-102n and the IBDM server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated form images to the IBDM server 106. A form is any document that includes fields (i.e., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image and capture any strokes written on the form image using the stylus or a fingertip of the user. The strokes are typically displayed on top of the image, just as if written by pen on paper. The computing pad usually captures the strokes as a sequence of points or segments along with location, timing and pressure information. The computing pad sends the form images including the captured strokes in any image format known to persons of ordinary skill in the art, for example, a Scalable Vector Graphics (SVG) file format, which can contain both strokes and images. In one embodiment, the computing pad attaches the information associated with the strokes, for example, the location and timing information with the form images as metadata. The portable computing device 102 determines location information by using global positioning system (GPS) circuitry or accessing a database including media access control (MAC) addresses. In one embodiment, the captured strokes are saved in a stroke format known to any person of ordinary skill in the art, including SVG or Ink Markup Language (InkML).

The image capture device 101 is coupled to the network 104 via signal line 111. Although only one image capture device 101 is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the IBDM server 106. In one embodiment, the image capture device 101 also sends an unmarked printed form image (i.e., an image of the printed form without any strokes) as metadata along with the captured image to the IBDM server 106. The image capture device 101 is, for example, a scanner, a digital camera, a standard cellular camera phone, a webcam, a video recorder, etc.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the IBDM server 106. For example, the user device 103 sends a request to view a table and/or to modify the table to the IBDM server 106. The user device 103 is accessed by users that have permission to access information from the IBDM server 106, such as a creator of the form sent to portable computing devices 102 or an administrator of the IBDM server 106.

The IBDM server 106 is a computing device including a memory and a processor and is coupled to the network 104 via signal line 116. The IBDM server 106 includes a view application 105. The view application 105 generates a collection from form images received from the portable computing devices 102a-102n and the image capture device 101, creates a first view of the collection based on at least one operation from a first user. In one embodiment, the view application 105 receives a selection of the first view of the collection from the first user that has access to the collection, runs a query associated with the first view of the collection and displays the first view of the collection to the first user. In another embodiment, the view application 105, receives a selection of the first view of the collection from a second user that has access to the collection, runs a query associated with the first view of the collection and displays the first view of the collection to the second user. Although only one IBDM server 106 is illustrated, persons with ordinary skill in the art will recognize that any number of IBDM servers 106 can be coupled to the network 104. The IBDM server 106 is described in further detail below with reference to FIG. 2.

Image Based Document Management (IBDM) Server 106

Figure 2:
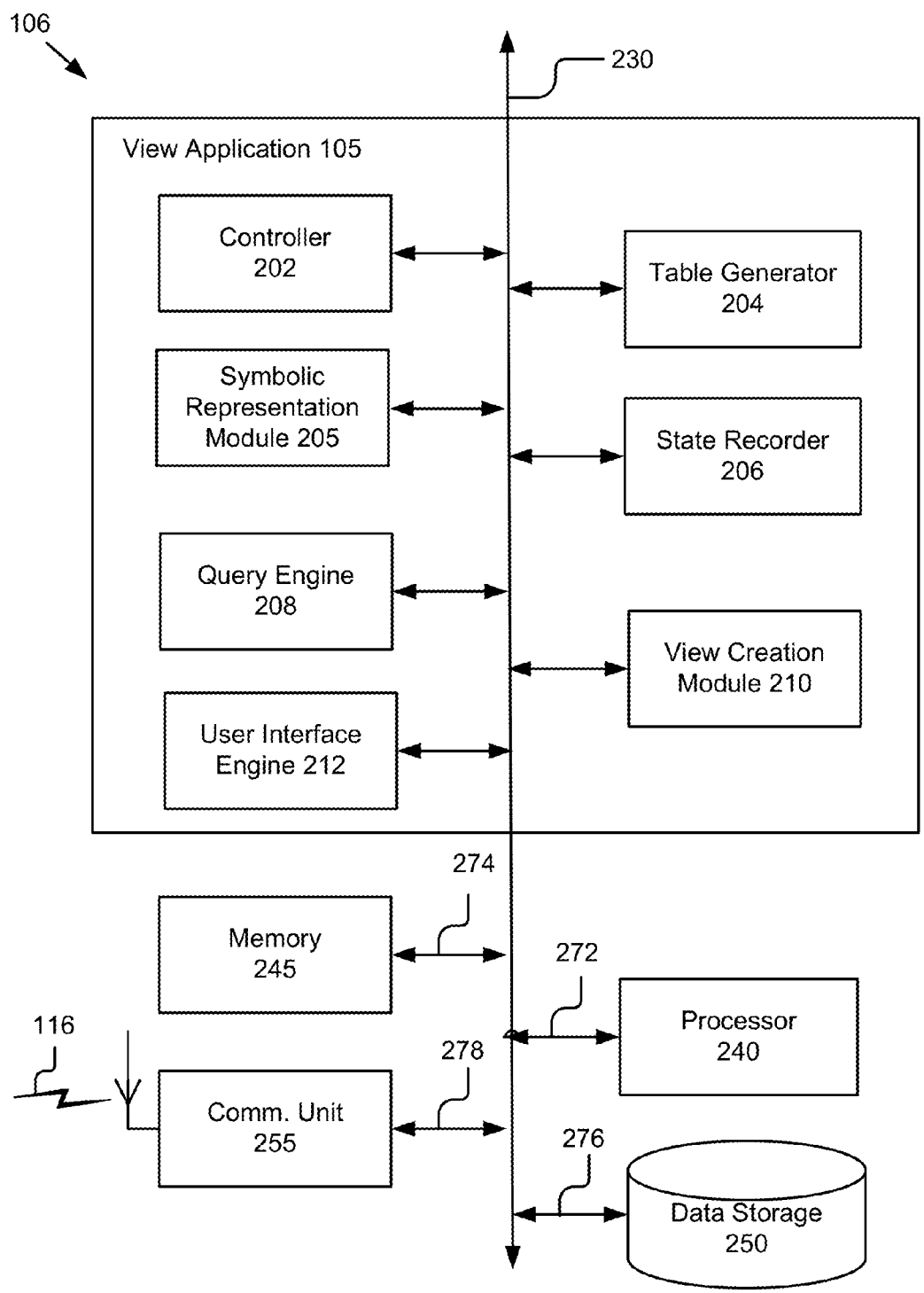
FIG. 2 is a block diagram illustrating one embodiment of an Image Based Document Management (IBDM) server that includes a view application.

Referring now to FIG. 2, the view application 105 is shown in more detail. FIG. 2 is a block diagram of the IBDM server 106 that includes a processor 240, a memory 245, a communication unit 255, data storage 250 and the view application 105.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the table generator 204, for example a request for querying a table. The communication unit 255 also receives information, such as form images, from the portable computing device 102. The communication unit 255 transmits the table to the user device 103, for example, the modified table in response to a query. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information for creating a view for a collection of forms that includes both image data and symbolic data. For example, the data storage 250 stores form images, a collection of the form images, views of the collection, queries associated with the views, requests for a view of the collection, etc. In one embodiment, the data storage 250 includes a database that stores data such as collections, views and queries. The data storage 250 is coupled to the bus 230 for communication with the other components via signal line 276.

In one embodiment, the view application 105 comprises a controller 202, a table generator 204, a state recorder 206, a query engine 208, a view creation module 210 and a user interface engine 212.

The controller 202 is software and routines for receiving data via the communication unit 255, routing the data to appropriate components of the view application 105 and transmitting responses from the components of the view application 105 to the communication unit 255 for transmitting to the user device 103 and other components of the system 100. In one embodiment, the controller 202 is a set of instructions executable by the processor 240 to provide the functionality described below for managing data transfer between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the view application 105.

Within this specification, stroke data is captured from forms as a sequence of points, line segments or curves, optionally including pressure, time and acceleration information associated with the strokes. For convenience, the strokes are frequently converted to images, but the images can include metadata about the strokes, like pressure or time data. The metadata could be included within the image or associated with the image in other ways. Stroke data and image data are frequently used interchangeably to refer to the data captured as strokes on the portable computing device 102.

The table generator 204 is software and routines for generating a table associated with a set of form images. In one embodiment, the table generator 204 is a set of instructions executable by the processor 240 to provide the functionality described below for generating the table. In another embodiment, the table generator 204 is stored in the memory 245 and is accessible and executable by the processor 240. In either embodiment, the table generator 204 is adapted for cooperation and communication with the processor 240, the communication unit 255 and other components of the view application 105.

The table generator 204 receives a set of form images that include strokes from the portable computing devices 102 via the controller 202, generates images of fields and labels from the set of form images that include strokes and generates a table that includes the images of fields and labels. For ease of understanding, future references to form images will be understood to be form images that also include stroke data from the completed forms. In one embodiment, the table generator 204 generates a field image by identifying a group of strokes in a form image, determining a bounding box that encompasses the group of strokes and determining the field image from the form image based on the bounding box. In some embodiments, the table generator 204 generates a label image by analyzing an area around a field image, identifying a group of related pixels as a label for the field image and cropping the label image from the form image. The table generator 204 organizes field images and label images to generate a table.

The table generator 204 generates a table associated with the set of form images based on field images and label images created from the forms. In one embodiment, the table generator 204 automatically generates a table by designating each label image as a column header of the table and populating each column with field images that are associated with each label image. In other embodiments, a user defines a label. The label is identified based on a form identifier and a location of field images, etc. In some embodiments, the table generator 204 also extracts metadata associated with the set of form images and incorporates the metadata into one or more columns of a table. For example, the table generator 204 extracts the date of when a form was filled out and adds a date column to the table.

In addition to determining field images and label images that are included in a table, the table generator 204 also determines an order of the field images and label images and organizes the field images and label images according to that order. For example, the table generator 204 generates a table from visitor registration forms filled by users such as Jane and Alice. The table generator 204 places "Jane" in a field above "Alice" in a "Name" column in the table because the metadata associated with the visitor registration forms filled out by Jane and Alice indicate that Jane filled out the form earlier than Alice. The table generator 204 also arranges the "Name" column as the first column of the table because the image of "Name" is located on the top of the visitor registration forms filled out by the users. Persons with ordinary skill in the art will recognize that the table generator 204 can arrange the field images and label images in a table in different orders.

The content in each cell in the table includes potentially four states: an empty value, image data, symbolic data or a combination of both image and symbolic data. The empty value indicates that a user does not input information in a field of a form that is used to generate a cell in the table. The image data includes handwriting, objects embedded into the form (e.g., a check box), strokes and other media (e.g., a photo). The image data is provided when a user fills out a form using a stylus or a fingertip on the portable computing device 102.

The symbolic data includes machine encoded text such as Universal Character Set Transformation Format 8-bit (UTF-8). The symbolic data may have semantic meaning like the words "true" and "false" which have meaning beyond the characters used in the words. In one embodiment, the symbolic data is included in a form that is used to generate the table. For example, a timestamp of a form that indicates when the form was submitted is symbolic. In other embodiments, the table generator 204 receives symbolic data from the symbolic representation module 205. In another embodiment, the table generator 204 connects to a human-in-the-loop (HITL) system such as the Mechanical Turk system provided by Amazon® for converting image data to symbolic data (not shown). In yet another embodiment, the table generator 204 transmits the image data to a user over the network 104 and the user manually converts the image data to symbolic data. In yet another embodiment, the table generator 204 classifies image data to generate symbolic data.

The table generator 204 stores the table as a collection of form images in a database (not shown). In one embodiment, the database is comprised in the data storage 250. In one embodiment, the table generator 204 assigns a unique collection identifier (ID) to a collection.

In one embodiment, the table generator 204 communicates with the user interface engine 212 to display an original view of the collection to a user. A view is a set of data in the collection that specifies the appearance of the collection. For example, a view includes data in the first ten rows of the first and third columns of the collection. When displaying the view to a user, the user interface engine 212 displays only the first ten rows of the first and third columns to the user. The original view of the collection is the view automatically created when the collection is generated. The table generator 204 uses default settings to create the original view of the collection, for example, includes all columns of the collection in the original view, arranges each row in a default order (e.g., a descending order of form submission dates) in the original view, assigns each cell in the original view with a default width, etc. The table generator 204 saves the original view of the collection as a default view and communicates with the user interface engine 212 to display the original view to a user. An arbitrary number of views (e.g., one, two, three) can be created for a collection based on user operations on the collection. Any view can be specified as a default view by a user. The views and creation of the views will be described in further detail below with reference to the view creation module 210.

The symbolic representation module 205 is software and routines for generating symbolic representations for image data in the table. In one embodiment, the symbolic representation module 205 is a set of instructions executable by the processor 240 to provide the functionality described below for generating symbolic representations. In another embodiment, the symbolic representation module 205 is stored in the memory 245 and is accessible and executable by the processor 240. In either embodiment, the symbolic representation module 205 is adapted for cooperation and communication with the processor 240, the communication unit 255 and other components of the IBDM server 106.

In one embodiment, the symbolic representation module 205 receives image data in field images or label images from the table generator 204 and generates symbolic data corresponding to the image data using, for example, Optical Character Recognition (OCR), Optical Mark Recognition (OMR), intelligent character recognition (ICR), handwriting recognition, pattern recognition, etc. For example, the symbolic representation module 205 performs handwriting recognition to get the name "Amy" from the handwritten version of her name.

In another embodiment, the symbolic representation module 205 classifies image data in a table to generate symbolic data. In one embodiment, the symbolic representation module 205 receives image data (e.g., strokes) included in field and label images in a column of a table, determines similarities among the image data in the column, classifies the image data in the column into K (e.g., one, two, three, . . . ) groups based on the similarities (e.g., by creating a hierarchical cluster), represents each group with classification data and uses the classification data as the symbolic data. In one embodiment, the symbolic representation module 205 extracts an example stroke from each group of the K groups and converts the example stroke to classification data. Although a group may contain different strokes, the symbolic representation module 205 selects a single example stroke and provides a single classification to represent the group.

The symbolic representation module 205 can generate symbolic data for a stroke in a table based on existing classification data related to the stroke instead of converting the stroke to symbolic data each time the stroke occurs, and thereby greatly reduces computing time for generating symbolic data. Using classification data for conversion is especially useful when a table includes the same type of strokes or the same strokes multiple times in multiple columns. Continuing with the above example, the symbolic representation module 205 receives the same type of strokes in the "Year" column, the "Number of Pets" column and the "Number of children" column. Once six groups are formed for the strokes in the "Number of Pets" column, the symbolic representation module 205 can use the six groups to generate symbolic data for the strokes in the "Year" column and the "Number of children" column.

In one embodiment, the symbolic representation module 205 converts a portion of the image data included in the table from the table generator 204 to the symbolic data. Converting all of the image data would be computationally expensive and unnecessary since much of the data is legible without being converted. In one embodiment, the symbolic representation module 205 stores the symbolic data in data storage 250. In another embodiment, the symbolic representation module 205 also transmits the symbolic data to the table generator 204.

The table generator 204 receives symbolic data from the representation module 205, associates the symbolic data with the image data from which the symbolic data is generated and updates the table. The updated table can include four types of data, e.g., an empty value, image data, symbolic data and image and symbolic data. For example, the table generator 204 updates rows of a first column of a table (e.g., cells) such that a first cell comprises image data and a second cell comprises image and symbolic data.

The image and symbolic data includes image data and symbolic data associated with the image data. In one embodiment, the table generator 204 communicates with the user interface engine 212 to display the image & symbolic data in a way that is different from displaying the other three types of data to highlight that the symbolic representation or image data is available, depending on which type of data is displayed. Other highlights are possible, such as a yellow background, underlining, a flag, an arrow, etc. In one embodiment, the table generator 204 also communicates with the user interface engine 212 to switch the display of the image data or the symbolic data contained in the image and symbolic data in response to receiving a request from a user.

The state recorder 206 is software and routines for creating and storing a state in response to receiving an operation that modifies a view of collection from a user. In one embodiment, the state recorder 206 is a set of instructions executable by the processor 240 to create and store a state. In another embodiment, the state recorder 206 is stored in the memory 245 and is accessible and executable by the processor 240. In either embodiment, the state recorder 206 is adapted for cooperation and communication with the processor 240 and other components of the view application 105.

The state recorder 206 communicates with controller 202 to track at least one operation that modifies a view of a collection of form images from a user (hereinafter also referred as "user operation"), defines and creates at least one state based on the at least one user operation and stores the at least one state in a database. The user operation includes any user selections that may cause a change to a view of the collection, for example, a user selecting a sort option to sort a column in an original view of the collection, or a user moving a column. The state recorder 206 receives user operations including a user clicking a button, the user selecting a menu, the user dragging a column and/or a row, the user dragging the boundary of a column and/or a row, etc. The user performs operations on the original view or other views of the collection.

In response to receiving a user operation, the state recorder 206 creates a state to describe the user operation. The state recorder 206 analyzes the user operation, characterizes the user operation based on the analysis and defines the state to include characteristics of the user operation. For example, the state recorder 206 receives a user operation for dragging a column of a collection. The state recorder 206 identifies the column in the collection and determines whether the user is dragging the column to a new position or the user is dragging the boundary of the column to resize the column. If the user operation is to drag the boundary of the column, the state recorder 206 determines whether the user is increasing or decreasing the width of the column and determines the size of the column that the user desires. The state recorder 206 characterizes this user operation by at least four characteristics, e.g., the column, boundary dragging of the column, expansion of the column size and the column size. The state recorder 206 creates a state to include the at least four characteristics.

In one embodiment, the state recorder 206 determines a set of categories and associated characteristics, categorizes a user operation and creates a state for the user operation based on the characteristics associated with a category. For example, when receiving a user operation of dragging a column to a position, the state recorder 206 categorizes this user operation into a column order category, determines that characteristics of the user operation that is categorized in the column order category include at least an old position of the column and a new position of the column and creates a state to include the characteristics. In one embodiment, the state recorder 206 determines a set of categories including a view priority category, a column order category, a date filter category, a column filter category, a zoom category, a label priority category, a sort category and a column width category. A user operation categorized in a category modifies a view of a collection and results in creation of a new view of the collection. The views created based on user operations in each category of the set of categories are depicted in FIGS. 7A-7H.

In one embodiment, the state recorder 206 creates at least one state and stores the at least one state in a database. In another embodiment, the state recorder 206 also transmits the at least one state to the query engine 208.

The query engine 208 is software and routines for generating a query based on at least one state received from the state recorder 206 and running the query in a database. In one embodiment, the query engine 208 is a set of instructions executable by the processor 240 to generate and run a query. In another embodiment, the query engine 208 is stored in the memory 245 and is accessible and executable by the processor 240. In either embodiment, the query engine 208 is adapted for cooperation and communication with the processor 240 and other components of the view application 105.

The query engine 208 receives at least one state that describes at least one user operation to a collection of form images from the state recorder 206 and generates a query in response to receiving the at least one state. For example, the query engine 208 generates a query in Structured Query Language (SQL) to select four columns of the collection for display in response to receiving at least one state that indicates hiding columns other than the four columns.

In one embodiment, the query engine 208 generates a query, runs the query in the database that stores the collection and sends the query result to the view creation module 210 for creating a view of the collection. In one embodiment, the query engine 208 stores the query and the view associated with the query in the database. In another embodiment, the query engine 208 retrieves a query associated with a view of the collection from the database in response to receiving a request from a user, runs the query in the database and communicates with the view creation module 210 and the user interface engine 212 to display the view to the user.

The view creation module 210 is software and routines for creating a view of a collection. In one embodiment, the view creation module 210 is a set of instructions executable by the processor 240 to create a view of a collection. In another embodiment, the view creation module 210 is stored in the memory 245 and is accessible and executable by the processor 240. In either embodiment, the view creation module 210 is adapted for cooperation and communication with the processor 240 and other components of the view application 105.

The table generator 204 generates a table from form images and stores the table as a collection in a database. The table generator 204 automatically generates an original view of the collection and communicates with the user interface engine 212 to display the original view to a user. The state recorder 206 communicates with the controller 202 to track user operations for the original view from the user, creates states based on the user operations and sends the states to the query engine 208. The query engine 208 receives the states, generates a query based on the states and runs the query in the database. The view creation module 210 creates a new view of the collection that is associated with the query based on the running of the query.

The table generator 204 creates the original view of the collection without receiving a user operation. The view creation module 210 creates views of the collection other than the original view in response to receiving at least one user operation from a user. In one embodiment, the view creation module 210 creates different views of the collection based on user operations to the original view of the collection. In another embodiment, the view creation module 210 creates a first view of the collection based on user operations to the original view of the collection, creates a second view of the collection based on user operations to the first view of the collection, and so on.

FIG. 3A depicts an example survey form 300 filled out by the user Indigo. The form includes fields for a first name, a date, a selection of being from or not being from California, a zip code, a phone number, an email address, a year in a current home or apartment, a number of pets, a number of children, drinking preferences, a reason for liking California and a selection for describing how hard it was to fill out the survey.

The table generator 204 converts a portion of image data in the survey form 300 to symbolic data and generates a table from the survey forms filled out by users. Each cell in the table includes one of image data, symbolic data, image and symbolic data and an empty value. The table generator 204 stores the table as a collection in a database and creates an original view of the collection. The user interface engine 212 instructed by the table generator 204 provides a user interface like the example user interface 330 in FIG. 3B to display the original view of the collection 332 to a user. The original view 332 includes all columns of the collection, rows in a descending order of form submission dates (e.g., shown in the "Date" column) and each cell in a default width. Although only image data (e.g., user handwriting in fields such as "First Name," "Date," "Zip Code.") is included in the original view 332 of the user interface 330, the original view 332 includes both image data and symbolic data. For example, the original view 332 includes symbolic data "true" or "false" associated with the image data shown in the fields of "From CA" and "Not From CA." The dashed ellipse 334 indicates that the original view of the collection 332 includes 72 rows.

A user viewing the original view 332 can perform at least one operation on the original view. In response to receiving the at least one operation from the user, the view creation module 210 modifies the original view 332 and creates a modified view. The view creation module 210 communicates with the user interface engine 212 to provide a user interface 350 to display the modified view 352 in FIG. 3C. Compared to the 72 rows in the original view 332, the dashed ellipse 354 in FIG. 3C indicates that the modified view 352 includes only 11 rows. In addition, the modified view 352 includes a different order of columns and fewer columns such that no columns are displayed in an area 356 in FIG. 3C while columns are shown in every area of FIG. 3B. If the user wants to save the modified view, the user can select the plus "+" button 345. The plus button 345 is activated and available when the user makes a modification. The minus button "−" is activated when there is at least one view stored on the IBDM server 106. In other words, the minus button will be grayed out until the user saves at least one view using the plus button. If the user deletes the view stored on the IBDM server 106, the minus button will be deactivated.

The view creation module 210 creates a view of a collection that is defined by a set of information. In one embodiment, the set of information includes a collection ID, a view name, a view priority, a column order, date filters, column filters, a current zoom factor, a label priority, a sort order and column widths.

The view creation module 210 creates a view for a single collection with a unique ID. For example, for two collections that have same fields and columns, the table generator 204 assigns two distinct IDs because the first collection contains a date represented symbolically in a field and the second collection contains strokes of the date in the same field. The view creation module 210 can create a view for either the first collection or the second collection. In one embodiment, the view creation module 210 includes the collection ID associated with the collection in a view.

The view creation module 210 interacts with a user via a user interface generated by the user interface engine 212 to assign a name to a view of a collection created based on the user's operations. Each view of a collection has a unique name. There is no restriction for a view name except that the names "Original" and "New View" cannot be used. These two names are reserved for special use. For example, the name "original" is reserved for the original view of the collection.

Figure 3C:
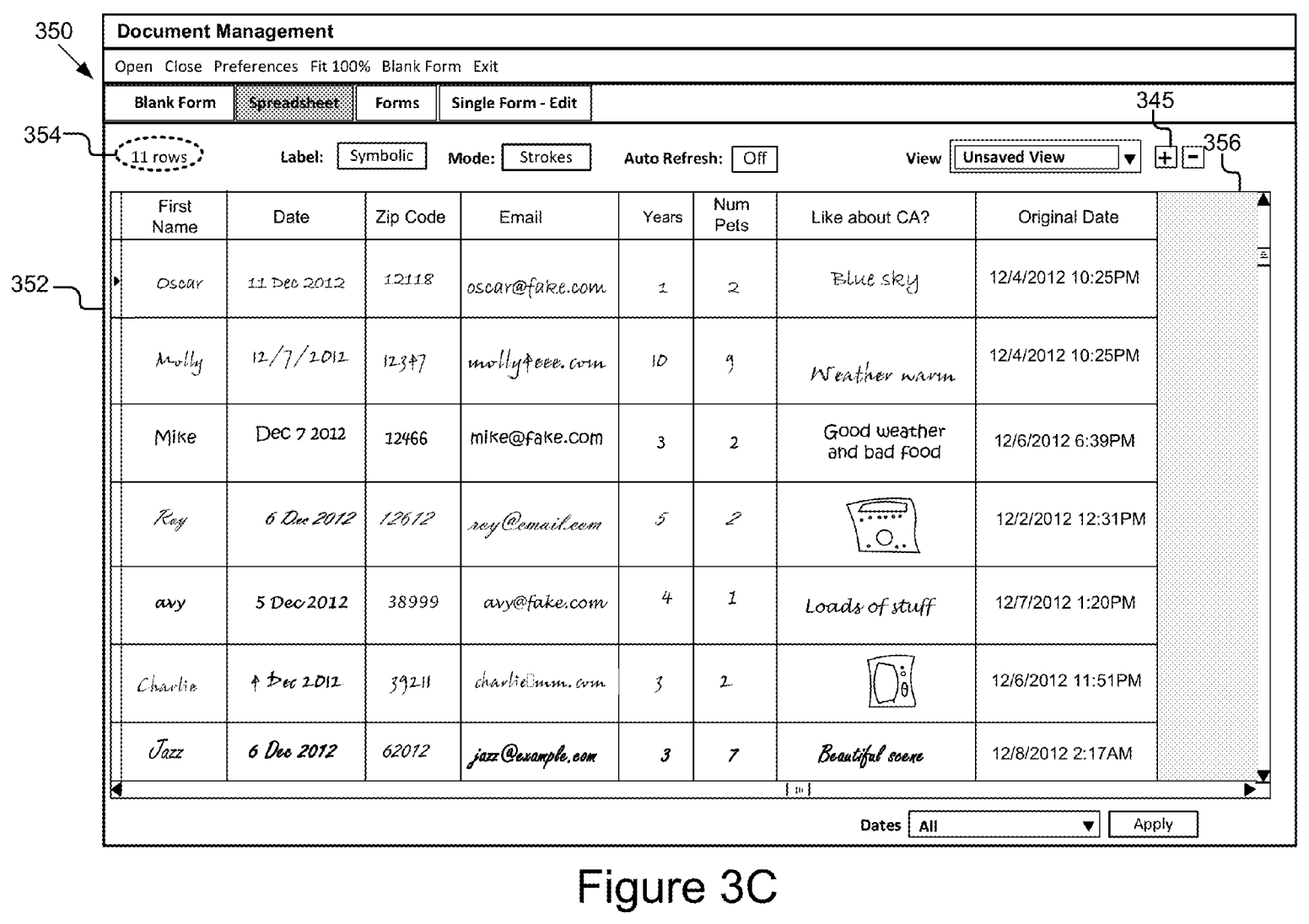

The view creation module 210 uses a view priority in the display of a view. When the view includes one or more cells with image and symbolic data in the same cell, the view priority determines whether image data or symbolic data is displayed to a user in the one or more cells. In one embodiment, the view creation module 210 changes the view priority in response to receiving a selection of a mode button from a user. For example, FIGS. 3B and 3C illustrate data in the stroke mode. When the mode button is in a stroke mode, the image data included in the image and symbolic data is displayed. When the mode button is in a symbolic mode, the symbolic data included in the image and symbolic data is displayed. The other three types of data, image data, symbolic data and an empty value, are displayed the same regardless of the selection of the mode button. An example view created based on switching a view priority is depicted in FIG. 7A and described in greater detail below.

The view creation module 210 creates a view based on determining a column order of the view. The view creation module 210 determines which columns are included in the view and in which order the columns are shown in the view based on data received from the state recorder 206 and the query engine 208, and creates a view to include the columns in the specified order. The columns that are not included in the view are hidden. The view includes at least one column. An example view created based on determining the column order is depicted in FIG. 7B and described in greater detail below.

The view creation module 210 creates a view based on implementing one or more date filters. For a collection of form images that includes date information (e.g., a submission date column indicates when the forms were filled out), the view creation module 210 determines one or more date filters based on data received from the state recorder 206 and the query engine 208, identifies a time span from the one or more date filters and includes the collection data within the time span in the view.

Figure 7C:
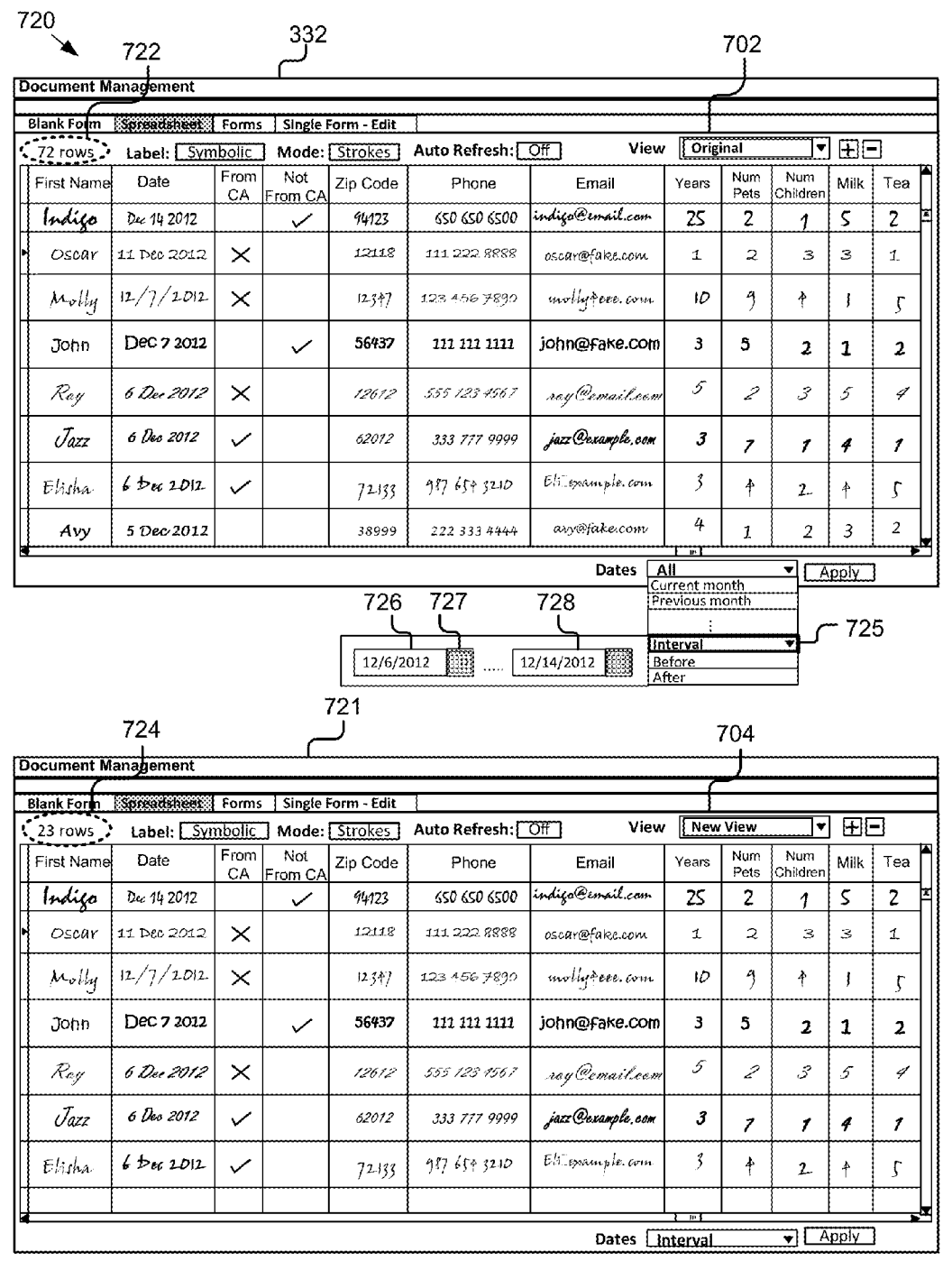

In one embodiment, a date filter includes a type. The type includes, for example, all, current month, previous month, last N months, current quarter, previous quarter, last N quarters, current year, previous year, current month, last N years, current week, previous week, last N weeks, today, yesterday, last N days, an interval, before and after. Different types are associated with different parameters. For example, the before and after types include a time unit parameter (e.g., before Jan. 12, 2013 or after Dec. 25, 2012), the last N months type (or years, weeks, days) does not include a time unit but includes a parameter N (e.g., last six months), while the interval type includes two parameters: a start date and an end date. An example view created based on implementing a date filter is depicted in FIG. 7C and described in greater detail below.

The view creation module 210 creates a view based on implementing one or more column filters. The view creation module 210 determines one or more column filters based on data received from the state recorder 206 and the query engine 208, identifies filter criteria from the one or more column filters, determines which cells in a column match the filter criteria and generates a view that matches the filter criteria.

In one embodiment, the view creation module 210 determines a column filter that is based on a data type. For example, the view creation module 210 determines a column filter to remove two types of data: image data and an empty value and creates a view to include only symbolic data and image and symbolic data.

The view creation module 210 can filter image data based on options including no image, total stroke length, image width, image height, image size, a number of strokes, a grouping of similar strokes and a percentage of black pixels. For example, the view creation module 210 creates a view to include the images that have a total stroke length greater than two centimeters. The view creation module 210 can filter symbolic data based on options including a regular expression, arithmetic, logical, does not contain and contains. For example, the view creation module 210 receives a column filter including the regular expression "^J[a-zA-Z]" and creates a view to include names that start with "J" in a "Name" column.

In another embodiment, the view creation module 210 determines a column filter that is based on clusters. In this case, instead of filtering a column according to the actual image data included in the column, the view creation module 210 classifies the image data in the column into K (e.g., one, two, three, . . . ) groups based on similarities among the image data and filters the column based on the classification. For example, if a "Star" column includes user rankings ranged from one to five, the view creation module 210 can create a view to include the results with rankings of three four or five based on clustered strokes. In this example, John wrote a number two in a field of the "Star" column using a stylus on his tablet. If the view creation module 210 determines that John's handwritten ranking is similar to a number "two" and classifies it with the two group, the resulting view will not include John's ranking.

In other embodiments, the view creation module 210 determines column filters that are based on time, date, etc. For example, the view creation module 210 creates a view to display collection data between a first time and a second time. An example view created based on implementing a column filter is depicted in FIG. 7D and described in greater detail below.

The view creation module 210 determines a current zoom factor and creates a view in the current zoom factor. The view creation module 210 determines the current zoom factor (e.g., 10%, 25%, 100%, 150%, 300%, etc.) based on data received from the state recorder 206 and the query engine 208. An example view created in a current zoom is depicted in FIG. 7E and described in greater detail below.

The view creation module 210 uses a label priority in the display of a view. A collection includes labels in column headers. When a column header of the collection includes image and symbolic data, the label priority determines whether to display image data or to display symbolic data in the column header. In one embodiment, the view creation module 210 changes the label priority in response to receiving a selection of a label button from a user. When the label button is in an image mode, the image data included in the image and symbolic data is displayed in the column header. When the label button is in a symbolic mode, the symbolic data included in the image and symbolic data is displayed in the column header. An example view created based on switching a label priority is depicted in FIG. 7F and described in greater detail below.

The view creation module 210 creates a view based on sorting a column. The view creation module 210 communicates with the state recorder 206 and the query engine 208 to determine which column to sort and in which order to sort the column. When the column includes image and symbolic data, the view creation module 210 also determines whether to sort the image and symbolic data with the image data or the symbolic data based on the priority specified for the sort. In some embodiments, there can be different stages of sorting, such as a first stage for specifying the priority of the data types with each other and a second stage for sorting within each data type. For example, a column "Name" in a collection includes a first stage priority of image data (e.g., handwritten names) over symbolic data (e.g., printed names), and a second stage priority of sorting the image data in the column "Name" in an ascending order of number of strokes of the handwritten names and the printed names in the column "Name" in a descending alphabetic order. In one embodiment, the view creation module 210 creates a view based on sorting multiple columns. An example view created based on sorting multiple columns is depicted in FIG. 7G and described in greater detail below.

The view creation module 210 creates a view based on determining column widths. The view creation module 210 determines a width for each column listed in a view based on data received from the state recorder 206 and the query engine 208 and creates the view to include each column in a determined width. An example view created based on determining column widths is depicted in FIG. 7H and described in greater detail below.

Once a view is created, the view creation module 210 instructs the user interface engine 212 to provide a user interface to display the view to a user. In one embodiment, the user interface includes an option for a user to save the view as a current view in a database. The user interface also includes options for a user to select an existing view from a list of views, to modify the existing view, to delete the existing view, to duplicate the existing view or to rename the existing view. Options for selecting, saving and deleting a view are described in more detail with reference to FIGS. 8A-8C.

In one embodiment, the view creation module 210 switches a view between users. The view creation module 210 communicates with other components of the view application 105 to create a first view of the collection based on at least one operation from a first user and display the first view of the collection to the first user. The view creation module 210 saves the first view of the collection in a database in response to receiving an instruction for saving the view from the first user. The view creation module 210 includes the saved first view in a list of existing views of the collection. The user interface engine 212 presents the list of existing views to a second user and receives a selection of the first view from the second user. This presumes that the second user has access to the collection. For example, the first and second users are in the same working group and each member in the group can access the collection. In response to receiving the selection from the second user via the controller 202, the query engine 208 retrieves a query associated with the first view from the database and runs the query in the database. The view creation module 210 creates the first view based on running the query and instructs the user interface engine 212 to display the first view of the collection to the second user.

A view encapsulates information of date filters, column filters and sorting orders and other information. By switching a view between users, a user can receive information from a view created based on another user's operations. The user does not create a new view for obtain the information. For example, Alice wants to get information of people with a name starting with the letter "H." Alice can select an existing view that includes such information instead of taking the time to create her own view.

Switching or sharing a view between users also reduces the time it takes to recreate a new view. For example, Amy wants to know who visited John in the past 20 days. Amy has access to a collection. Amy checks the list of existing views of the collection and finds that a view named as "Recent Visitor" has been created based on Ryan's operations. Amy initiates a request for this "Recent Visitor" view and receives the "Recent Visitor" view. The "Recent Visitor" view includes visitor names in last month. Even if this view does not completely match Amy's need, it is easy for Amy to modify this view instead of other views to get a view that shows who visited John in the past 20 days.

When a view is switched between users, the query engine 208 retrieves a query associated with the view from a database and re-runs the query. Since the query engine 208 re-runs the query in a current database, a view is updated with the most recent information in the current database. For example, a collection includes log data that is updated daily (e.g., a collection of every day's traffic data). A first view is created to show all traffic accidents that occurred between 4 PM and 6 PM on any day. When a second user requests the first view a few days after the first view was created, re-running the query associated with the first view will result in more rows in the first view since more accidents may happen during the few days after the first view was created.

The user interface engine 212 is software and routines for generating graphical data for displaying a user interface. In one embodiment, the user interface engine 212 is a set of instructions executable by the processor 240 to generate the user interface. In another embodiment, the user interface engine 212 is stored in the memory 245 and is accessible and executable by the processor 240. In either embodiment, the user interface engine 212 is adapted for cooperation and communication with the processor 240 and other components of the view application 105.

In one embodiment, the user interface engine 212 generates graphical data for displaying a view of a collection to a user. In one embodiment, the user interface engine 212 generates a user interface for displaying an original view of a collection to a user in response to the table generator 204 storing a table of the collection of forms in a database. In another embodiment, the user interface engine 212 receives instructions from the view creation module 210 to generate a user interface for displaying a new view to a user in response to receiving at least one user operation from the user. In yet another embodiment, the user interface engine 212 generates a user interface for displaying an existing view retrieved from a database to a user in response to receiving a request from the user.

In another embodiment, the user interface engine 212 generates a user interface for receiving user input. In one example, the user interface engine 212 provides a user interface to receive a user operation that modifies a view of a collection (e.g., selecting options for sorting a column of the collection). In another example, the user interface engine 212 provides a user interface for a user to select a view, save a view, delete a view, rename a view, modify an existing view, duplicate an existing view, etc.

Methods

Figure 4:
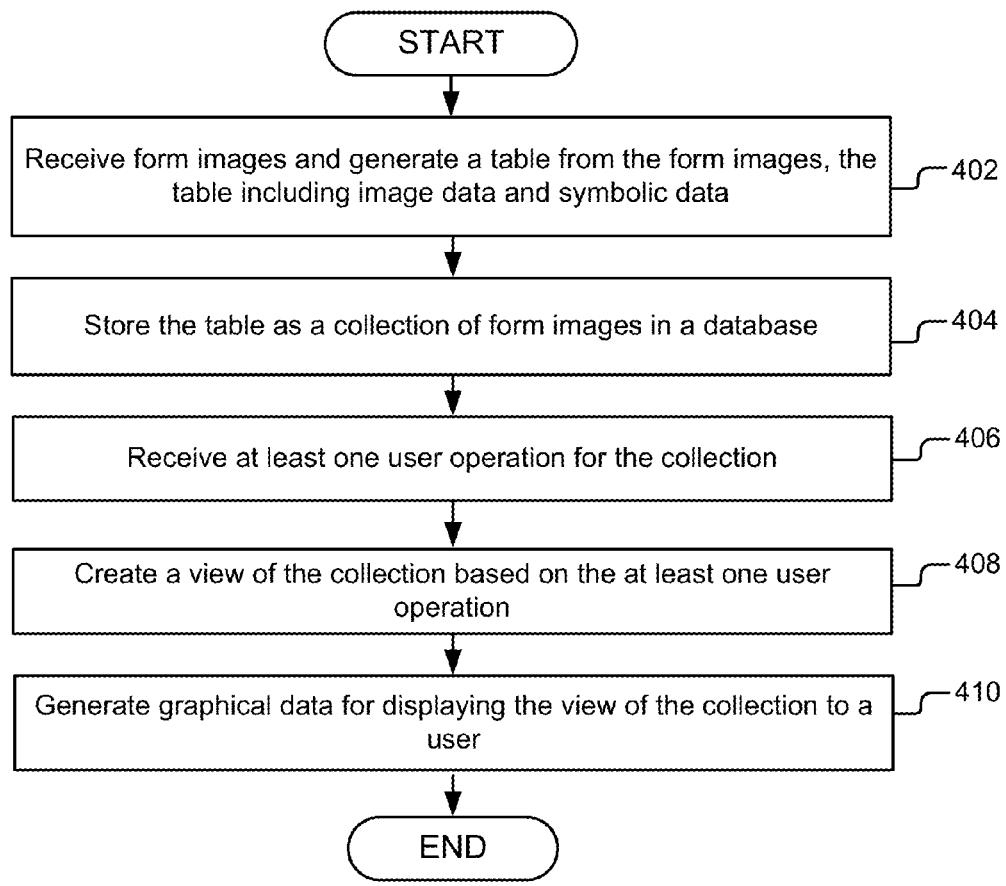
FIG. 4 is a flow diagram of one embodiment of a method for creating a view of a collection.
Figure 5:
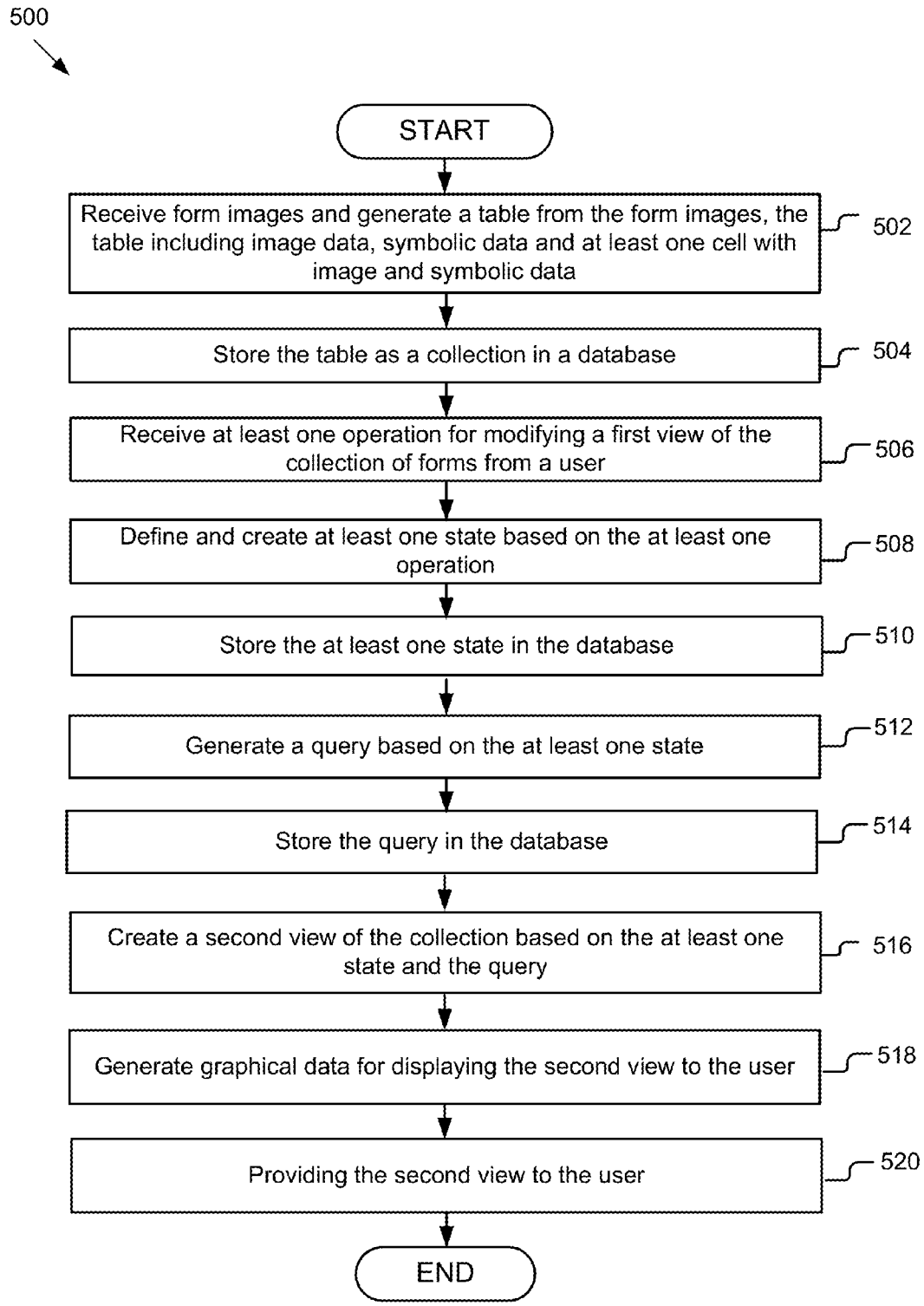
FIG. 5 is a flow diagram of another embodiment of a method for creating a view of a collection.
Figure 6:
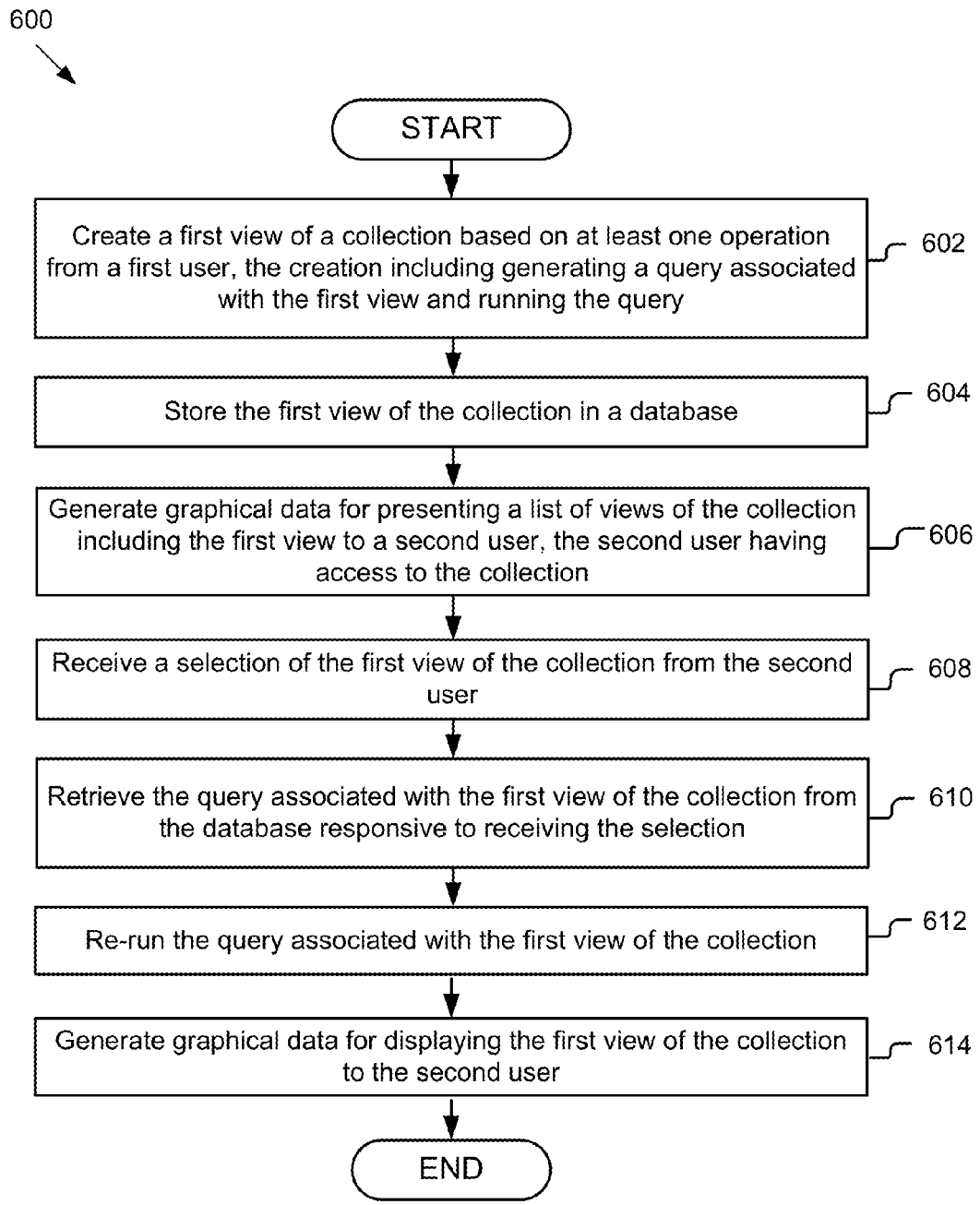
FIG. 6 is a flow diagram of one embodiment of a method for switching a view of a collection between users.

Referring now to FIGS. 4-6, the methods of the invention will be described in more detail. FIG. 4 is a flow diagram 400 that illustrates one embodiment of a method for creating a view of a collection. The view application 105 includes a table generator 204, a state recorder 206, a view creation module 210 and a user interface engine 212. The table generator 204 receives 402 form images from the portable computing devices 102 and generates a table from the form images, the table including image data and symbolic data. In one embodiment, the table generator 204 generates images of fields and labels from a set of form images and generates a table that includes field images and label images.

The cells in the table include potentially four states: an empty value, image data, symbolic data or image and symbolic data. The empty value indicates that a user does not input information in a field of a form that is used to generate the table. The image data includes handwriting, objects embedded into the form (e.g., a check box), strokes and other media (e.g., a photo). The image data is provided when a user fills out a form using a stylus or a fingertip on the portable computing device 102.

The symbolic data includes information stored as Unicode characters (e.g., using UTF-8 encoding). In one embodiment, the symbolic data is included in a form that is used to generate the table. In other embodiments, the table generator 204 generates symbolic data by converting a portion of image data included in a form to symbolic data. The table generator 204 converts image data to generate symbolic data, associates the symbolic data to the image data and saves both the symbolic data and the image data in a single cell of the table as image and symbolic data.

The table generator 204 stores 404 the table as a collection of form images in a database. The state recorder 206 receives 406 at least one user operation for the collection. In one embodiment, the state recorder 206 communicates with the user interface engine 212 to track at least one operation that modifies a view of a collection of form images from a user (hereinafter also referred as "user operation"), defines and creates at least one state based on the at least one user operation and stores the at least one state in a database. The user operation includes any user selections that may cause a change to a view of the collection, for example, a user selecting a sort option to sort a column in an original view of the collection or a user moving a column.

The view creation module 210 creates 408 a view of the collection based on the at least one user operation. The view creation module 210 instructs the user interface engine 212 to generate 410 graphical data for displaying the view of the collection to a user.

FIG. 5 is a flow diagram 500 that illustrates another embodiment of a method for creating a view of a collection. The view application 105 includes a table generator 204, a state recorder 206, a query engine 208, a view creation module 210 and a user interface engine 212. The table generator 204 receives 502 form images from the portable computing devices 102 and generates a table from the form images, the table including image data, symbolic data and at least one cell with image and symbolic data. The table generator 204 stores 504 the table as a collection of form images in a database. The state recorder 206 receives 506 at least one user operation for modifying a first view of the collection of forms from a user. The state recorder 206 defines 508 and creates at least one state based on the at least one user operation. The state recorder 206 creates the at least one state to describe the at least one user operation. In one embodiment, the state recorder 206 analyzes the user operation, characterizes the user operation based on the analysis and defines the state to include characteristics of the user operation. The state recorder 206 stores 510 the at least one state in the database.

The query engine 208 generates 512 a query based on the at least one state. For example, the query engine 208 generates a query in Structured Query Language (SQL) to select four columns of the collection in response to receiving at least one state that indicates hiding all but the four columns. The query engine 210 stores 514 the query in the database. The view creation module 210 creates 516 a second view of the collection based on the at least one state and the query. The creation module 210 instructs the user interface engine 212 to generate graphical data for displaying 518 the second view to a user. The communication unit 255 provides 520 the second view to the user, for example, by transmitting the graphical data to the user device 103.

FIG. 6 is a flow diagram 600 that illustrates one embodiment of a method for switching a view between users. The view application 105 includes a table generator 204, a state recorder 206, a query engine 208, a view creation module 210 and a user interface engine 212. The view creation module 210 creates 602 a first view of a collection based on at least one operation from a first user, the creation including generating a query associated with the first view and running the query. In one embodiment, the state recorder 206 tracks user operations from the first user, creates states based on the user operations and sends the states to the query engine 208. The query engine 208 receives the states, generates a query based on the states and runs the query in a database. The view creation module 210 creates the first view based on the query results. The view creation module 210 stores 604 the first view of the collection in a database.

The view creation module 210 communicates with the user interface 212 to generate 606 graphical data for presenting a list of views of the collection including the first view to a second user, the second user having access to the collection. The user interface engine 212 receives 608 a selection of the first view of the collection from the second user. For example, the first and second users are in the same working group and each member in the group can access the collection. The query engine 208 retrieves 610 the query associated with the first view of the collection from the database responsive to receiving the selection. The query engine 208 re-runs 612 the query associated with the first view of the collection in the database. The user interface engine 212 generates 614 graphical data for displaying the first view of the collection to the second user.

Example User Interfaces

FIGS. 7A-7H are example graphic representations of user interfaces generated by the user interface engine 212. Each of the figures includes two views of a collection of tables. The first user interface 332 in each figure is the original view of the collection that is also shown in FIG. 3B. It is named as "Original" in a combo-box 702. The second user interface at the bottom of each figure is a modified view of the collection that is created based on at least one user operation that modifies the first user interface 332. It is named the "New View" in combo-box 704.

FIG. 7A is an example 700 of two views of a collection of tables. The first user interface includes the original view 332 and the second user interface includes a modified view 701. The modified view 701 is created based on a user changing the view priority of the original view 332. The state recorder 206 receives a selection of a mode button on the original view 332 from the controller 202. The user selects the mode button to change it from "Strokes" 706 to "Symbolic" 708, which indicates a change to the view priority from displaying image data to symbolic data. The state recorder 206 creates a state based on the user selection and transmits the state to the query engine 208. The query engine 208 generates a query based on the state and runs the query. The view creation module 210 creates the modified view 701 based on the running of the query. In both the original view 332 and the modified view 701, the user interface engine 212 generates graphical data for displaying the same image data in columns "Zip Code," "Num Pets," "Num Children," "Milk" and "Tea." The difference between the original view 332 and the modified view 701 is shown in the display of image and symbolic data in columns "First Name," "Date," "Phone," "Email," "Years" and some cells of the columns "From CA" and "Not From CA." In the original view 332 with the mode button in "Strokes," the user interface engine 212 displays handwriting in the columns "First Name," "Date," "Phone," "Email" and "Years," and images in some cells of the columns "From CA" and "Not From CA." Not all of the data in those columns was available as symbolic data. For example, in the "First Name" column, "Indigo" and "Elisha" remain as image data. In the modified view 701 with the mode button in "Symbolic," the user interface engine 212 displays printed text in the columns "First Name," "Date," "Phone," "Email," "Years" and some cells of the columns "From CA" and "Not From CA."

FIG. 7B is an example 710 of two views of a collection of tables. The first user interface includes the original view 332 and a modified view 711. The view creation module 210 communicates with the state recorder 206 and the query engine 208 to create the modified view 711 based on a user changing a column order from the original view 332 (e.g., selecting a column to drag to a position and selecting a column to hide). In the original view 332, the user interface engine 212 displays "First Name" in the first column 712 and "Date" in the second column 714. The user interface engine 212 also displays ten other columns (e.g., "From CA," "Not From CA," "Zip Code," etc.) in the original view 332. In the modified view 711, the user interface engine 212 displays "Date" in the first column 716 and "First Name" in the second column 718. The user interface engine 212 also displays other eight columns in the modified view 711. The columns "Milk" and "Tea" are removed from the modified view 711. A gray area 719 without columns is also shown in the modified view 711.

FIG. 7C is an example 720 of two views of a collection of tables. The first user interface includes the original view 332 and the second user interface includes a modified view 721. The modified view 721 is created based on implementing a date filter. The modified view 721 includes collection data within a time span specified by a user. The dashed ellipse 722 indicates that the original view 332 includes 72 rows. The dashed ellipse 724 indicates that the modified view 721 includes 23 rows that match the date filter. The date filter is shown in a drop-down menu in the bottom right corner of the original view 332. The user selects the type of "interval" 725 from the drop-down menu and specifies a start date in an edit box 726 and an end date in an edit box 728. The user can also use an expandable calendar box 727 to select a start date and an end date.

FIG. 7D is an example 730 of two views of a collection of tables. The first user interface includes the original view 332 and the second user interface includes a modified view 731. The modified view 731 is created based on implementing a column filter. The modified view 731 includes collection data that matches the column filter. In this example, the column filter is to filter out people who do not come from California. As a result, each row in the modified view 731 is associated with a selected "From CA" field and an unselected "Not From CA" field, and the modified view 731 includes 45 rows as shown in the dashed ellipse 734 while the original view 332 includes 72 rows as shown in the dashed ellipse 732.

FIG. 7E is an example 740 of two views of a collection of tables. The first user interface includes the original view 332 and the second user interface includes a modified view 741. The modified view 741 is created based on a user zooming in the original view 332 (e.g., selecting a pop-up menu). The user interface engine 212 displays eight rows in the original view 332 and six rows in the modified view 741. The user interface engine 212 also displays twelve columns in the original view 332 (e.g., the last column 742 is the column "Tea") and eight complete columns in the modified view 741 (e.g., the last column 744 is a partial column "Num Pets").

FIG. 7F is an example 750 of two views of a collection of tables. The first user interface includes the original view 332 and the second user interface includes a modified view 751. The modified view 751 is created based on a user changing the label priority of the original view 332. When a user selects a label button in the user interface 750, the label priority is changed. In the original view 332 with the label button in "Symbolic" 752, the user interface engine 212 displays printed text in column headers such as the column header "Zip Code" 756 and the column header "Phone" 758. In the modified view 751 with the label button in "Strokes" 754, the user interface engine 212 displays images in column headers that are from the form such as column headers "Zip Code" 757 and "Phone" 759.

FIG. 7G is an example 760 of two views of a collection of tables. The first user interface includes the original view 332 and the second user interface includes a modified view 761. The modified view 761 is created based on a user sorting at least one column of the original view 332 (e.g., selecting a drop-down menu). In this example, the modified view 761 is created by sorting the "Years" column 762 first and rows within the "First Name" column 764 grouped based on the "Years" column. To create the modified view 761, the view creation module 210 communicates with the state recorder 206 and the query engine 208 to sort the original view 332 according to the symbolic data included in the image & symbolic data in the column "Years." In this example, the column "Years" is sorted in an ascending numeric order. For the cells in the column "Years" that include the same symbolic data (e.g., the cells include the number three), the view creation module 210 communicates with the state recorder 206 and the query engine 208 to sort the original view 332 according to the symbolic data included in the image and symbolic data in the column "First Name." In this example, the column "First Name" is sorted in an ascending alphabetic order. For example, within the group of people that have been in a house or apartment for three years, the rows for Elisha, Jazz and John are sorting in ascending alphabetical order.

FIG. 7H is an example 770 of two views of a collection of tables. The first user interface includes the original view 332 and the second user interface includes a modified view 771. The modified view 771 is created based on a user changing a column width in the original view 332 (e.g., dragging the boundary of the column). In this example, the modified view 771 is created by increasing the width of the column "Zip Code," e.g., expanding the width 772 to the width 774.

Figure 8A:
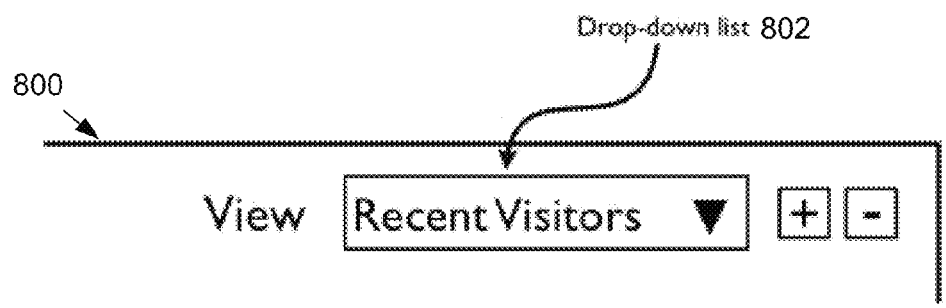
FIG. 8A is an example graphic representation of a dialog box for selecting a view.

FIG. 8A is an example graphic representation of a dialog box 800 for selecting a view. In one embodiment, the user interface engine 212 provides a user interface to display the dialog box 800 along with a view of a collection to a user. For example, the dialog box appears in the upper right corner of the user interface shown in FIG. 3C. The dialog box 800 includes a drop-down list 802 that lists views of a collection that are currently available and accessible by a user. In response to a user selecting a view listed in the drop-down list 802, the user interface 212 displays the view to the user. The name of a current view is shown in the drop down list 802. In this example, the current view is "Recent Visitors." When a collection is first loaded, the current view is a default view and the name of the default view is shown in the drop down list 802. The default view can be the original view of the collection or a user-specified view. When a user modifies part of the current view, for instance, by hiding a column, reordering the columns or changing the sort order of a column, the name in the drop-down list 802 is changed to "New View." This is an indication to the user that the current view is modified and has not been saved.

Figure 8B:
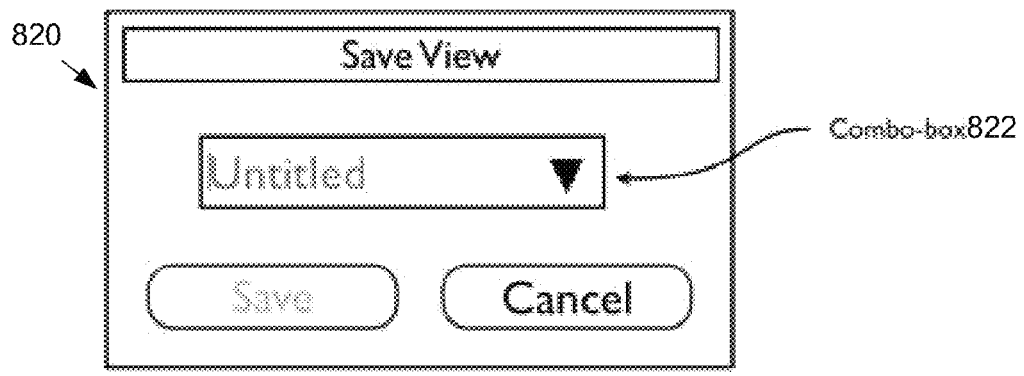
FIG. 8B is an example graphic representation of a dialog box for saving a view.

FIG. 8B is an example graphic representation of a dialog box 820 for saving a view of a collection. In one embodiment, the user interface engine 212 provides a user interface to display the dialog box 820 along with a view of a collection to a user. For example, when a user selects the "+" button in the upper right corner of the user interface shown in FIG. 8A, a "Save View" dialog box pops up for the user to save a current view. The "Save View" dialog box 820 includes an editable combo-box 822, a save button and a cancel button. In one example, a user inputs a name in the combo-box 822 and clicks the save button to save a view with the name. In another example, the user selects a name from a list of names presented in the combo-box 822. The list of names includes names of existing views saved for the collection. The user clicks the save button to overwrite the existing view. In this way, the user modifies a saved view. If the user selects the cancel button, the dialog box 820 will be dismissed and no change will occur.

Figure 8C:
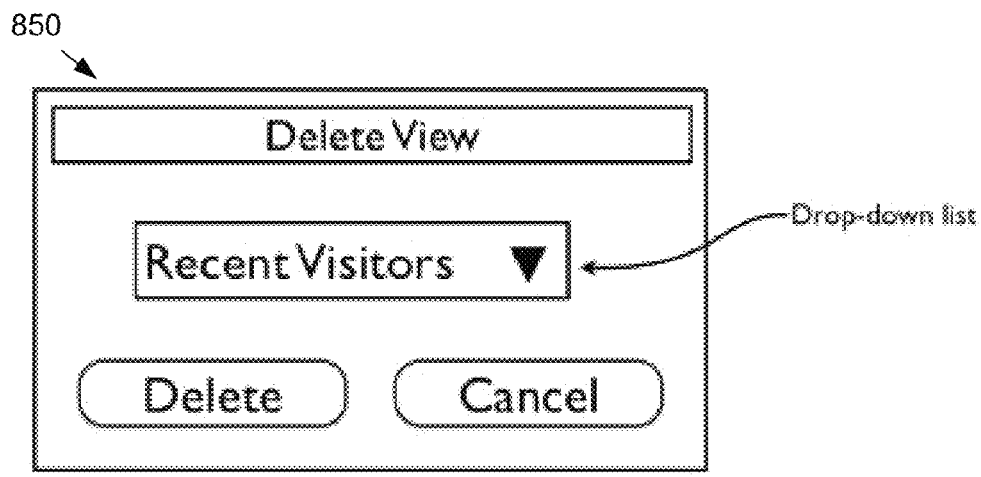
FIG. 8C is an example graphic representation of a dialog box for deleting a view.

FIG. 8C is an example graphic representation of a dialog box 850 for deleting a view. In one embodiment, the user interface engine 212 provides a user interface to display the dialog box 850 along with a view of a collection to a user. For example, when a user selects the "−" button in the upper right corner of the user interface shown in FIG. 8A, a "Delete View" dialog box pops up for the user to delete a current view. The "Delete View" dialog box 850 includes a drop-down menu listing the views saved for a collection, a delete button and a cancel button. When a user selects a view from the list and selects the delete button, the currently shown view is deleted. If the user selects the cancel button, the dialog box 850 will be dismissed and no change will occur.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
generating, using one or more computing devices, a table from form images and storing the table in a database as a collection of the form images, a first cell of the table including image data and symbolic data corresponding to first information, a second cell of the table including image data corresponding to second information;
providing a first view of the collection to a first user by displaying the image data corresponding to the first information in the first cell and displaying the image data corresponding to the second information in the second cell, wherein the first cell, including both the image data and the symbolic data corresponding to the first information, is highlighted to indicate that symbolic data is available for the first cell and to be visually different from the second cell including only the image data corresponding to the second information;
receiving, using the one or more computing devices, an operation for modifying the first view of the collection from the first user;
creating, using the one or more computing devices, a second view of the collection based on the operation; and
providing the second view of the collection to the first user by displaying the symbolic data corresponding to the first information in the first cell and displaying the image data corresponding to the second information in the second cell.

2. The method of claim 1, further comprising:
providing a list of views of the collection including the first view of the collection to a second user, the second user having access to the collection;
receiving a selection of the first view of the collection from the second user; running, using the one or more computing devices, a query associated with the first view of the collection; and
providing the first view of the collection to the second user.

3. The method of claim 1, further comprising:
generating a query associated with the second view;
running the query associated with the second view; and
wherein creating the second view of the collection is based on running the query.

4. The method of claim 1,
wherein providing the first view of the collection further comprises determining at least one of a view priority, a column order, a date filter, a column filter, a current zoom factor, a label priority, a sort order and a column width.

5. The method of claim 4,
wherein determining the column filter further comprises determining to use the image data or the symbolic data to filter a column that has both the image data and the symbolic data.

6. The method of claim 4,
wherein determining the column filter further comprises classifying the image data in a column to clusters and filtering the column using the clusters.

7. The method of claim 1, further comprising:
categorizing the operation and describing the operation based on characteristics associated with a category.

8. The method of claim 1,
wherein generating the table from the form images further comprises converting the image data in the form images to the symbolic data.

9. The method of claim 1, wherein the first view of the collection comprises a collection identifier and a name.

10. A system comprising:
one or more processors;
a table generator stored on a memory and executable by the one or more processors, the table generator configured to generate a table from form images and store the table in a database as a collection of the form images, a first cell of the table including image data and symbolic data corresponding to first information, a second cell of the table including image data corresponding to second information;
a state recorder stored on the memory and executable by the one or more processors, the state recorder configured to receive an operation for modifying a first view of the collection from a first user;
a view creation module stored on a memory and executable by the one or more processors, the view creation module configured to create a second view of the collection based on the operation; and
a communication unit stored on a memory and executable by the one or more processors, the communication unit configured to provide the first view of the collection to the first user by displaying the image data corresponding to the first information in the first cell and displaying the image data corresponding to the second information in the second cell, wherein the first cell, including both the image data and the symbolic data corresponding to the first information, is highlighted to indicate that symbolic data is available for the first cell and to be visually different from the second cell including only the image data corresponding to the second information, and provide the second view of the collection to the first user by displaying the symbolic data corresponding to the first information in the first cell and displaying the image data corresponding to the second information in the second cell.

11. The system of claim 10,
wherein the communication unit is further configured to provide a list of views of the collection including the first view of the collection to a second user, the second user having access to the collection, wherein the state recorder is configured to receive a selection of the first view of the collection from the second user, and further comprising:
a query engine configured to run a query associated with the first view of the collection; and wherein the communication unit is further configured to provide the first view of the collection to the second user.

12. The system of claim 10, further comprising:
a query engine stored on the memory and executable by the one or more processors, the query engine configured to generate a query associated with the second view and run the query, and wherein creating the second view of the collection is based on running the query.

13. The system of claim 10, wherein the view creation module is further configured to create the first view of the collection, and wherein creating the first view of the collection further comprises determining at least one of a view priority, a column order, a date filter, a column filter, a current zoom factor, a label priority, a sort order and a column width.

14. The system of claim 13, wherein determining the column filter further comprises determining to use the image data or the symbolic data to filter a column that has both the image data and the symbolic data.

15. The system of claim 13, wherein determining the column filter further comprises classifying the image data in a column to clusters and filtering the column using the clusters.

16. The system of claim 10, wherein the state recorder is further configured to categorize the operation and describe the operation based on characteristics associated with a category.

17. A computer program product comprising a non-transitory computer useable medium including a computer readable program, wherein the computer readable program when executed on a computer causes the computer to:
generate a table from form images and store the table in a database as a collection of the form images, a first cell of the table including image data and symbolic data corresponding to first information, a second cell of the table including image data corresponding to second information;
provide a first view of the collection to a first user by displaying the image data corresponding to the first information in the first cell and displaying the image data corresponding to the second information in the second cell, wherein the first cell, including both the image data and the symbolic data corresponding to the first information, is highlighted to indicate that symbolic data is available for the first cell and to be visually different from the second cell including only the image data corresponding to the second information;
receive an operation for modifying the first view of the collection from the first user;
create a second view of the collection based on the operation; and
provide the second view of the collection to the first user by displaying the symbolic data corresponding to the first information in the first cell and displaying the image data corresponding to the second information in the second cell.

18. The computer program product of claim 17, further comprising:
providing a list of views of the collection including the first view of the collection to a second user, the second user having access to the collection;
receiving a selection of the first view of the collection from the second user; running a query associated with the first view of the collection; and providing the first view of the collection to the second user.

19. The computer program product of claim 17, further comprising:
generating a query associated with the second view;
running the query associated with the second view; and
wherein creating the second view of the collection is based on running the query.

20. The computer program product of claim 17, wherein to provide the first view of the collection, the computer readable program causes the computer to determine at least one of a view priority, a column order, a date filter, a column filter, a current zoom factor, a label priority, a sort order and a column width.

* * * * *